(12) United States Patent  (10) Patent No.: US 6,225,614 B1
Ono  (45) Date of Patent: May 1, 2001

(54) LENS BARREL AND MOTION COMPENSATION DEVICE HAVING A MOTION COMPENSATION OPTICAL SYSTEM POSITION DETECTION UNIT

(75) Inventor: Yoshiko Ono, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/144,649

(22) Filed: Aug. 31, 1998

(30) Foreign Application Priority Data

Aug. 29, 1997 (JP) .................................................. 9-234267
Jan. 13, 1998 (JP) ................................................ 10-004423

(51) Int. Cl.[7] ..................................................... G02B 7/04
(52) U.S. Cl. ........................ 250/201.5; 396/55; 359/554; 348/208
(58) Field of Search ............................. 250/201.5, 201.2, 250/201.4, 201.8, 208.1; 396/53, 55, 52; 359/554–557; 348/208

(56) References Cited

U.S. PATENT DOCUMENTS 5,809,347 * 9/1998 Usui ........................................ 396/53

* cited by examiner

Primary Examiner—Que T. Le

(57) ABSTRACT

A motion compensation device to compensate for motion of an optical system causing image blur, and having a position detection device to detect a position of a motion compensation optical system relative to a lens barrel. The position detection device includes an LED to emit light, a position sensing device (PSD) to sense light received from the LED and a light screening device having a slit between the LED and PSD. The lens barrel includes a movable tube to which the LED is fixed, and a fixed tube to which the PSD is fixed. During photography, the movable tube moves in the optical axis direction from a collapsed state causing the distance between the LED and the PSD to become long, and causing a light ray emitted from the LED and incident on the slit to form a small angle with a line perpendicular to the center of the slit. As a result, an error which arises between the position of a light ray incident on a light receiving surface of the PSD and the actual position of the slit is small, and the precision of position detection of the motion compensation optical system increases. When photography does not occur, the movable tube moves in the optical axis direction and retracts into the fixed tube. As a result, the distance between the LED and PSD is short, resulting in a smaller lens barrel.

25 Claims, 13 Drawing Sheets

LENS BARREL AND MOTION COMPENSATION DEVICE HAVING A MOTION COMPENSATION OPTICAL SYSTEM POSITION DETECTION UNIT

CROSS-REFERENCE TO RELATED APPLICATIONS

This application is based upon and claims priority of Japanese Patent Application No. 09-234267 filed Aug. 29, 1997 and Japanese Patent Application No. 10-004423 filed Jan. 13, 1998, the contents being incorporated herein by reference.

BACKGROUND OF THE INVENTION

1. Field of the Invention

The present invention relates to a lens barrel and motion compensation device to compensate for motion causing image blur in a camera, such as a silver salt camera, digital camera, or the like. More particularly, the present invention relates to a motion compensation device having a motion compensation optical system position detection device to detect a position of a motion compensation optical system relative to the lens barrel.

2. Description of the Related Art

A conventional motion compensation device in a camera compensates for blur of an image projected onto an image plane which occurs during photography as a result of vibration of the camera caused by, for example, hand shake of the photographer, or the like. The conventional motion compensation device includes a motion detection unit to detect vibration caused by hand shake or the like, and to output a motion detection signal; a motion compensation optical system, constituting at least a portion of the photographic optical system, which moves relative to the lens barrel in a direction at right angles to the photographic optical axis (referred to as "optical axis" hereinbelow), and causes the optical axis to change to compensate for the motion in the image plane causing image blur; a position detection unit to detect the relative position of the motion compensation optical system with respect to the lens barrel and to output a position detection signal; a calculating unit to calculate an amount of optical axis change necessary to compensate for the motion causing image blur; and a drive unit to drive the motion compensation optical system according to the correction amount.

FIG. 12 illustrates a conventional position detection unit of a motion compensation device. The conventional position detection unit includes a position sensing device (PSD) and a light emitting diode (LED) to detect the position of the motion compensation optical system. More particularly, FIG. 12 is a schematic diagram showing the change of position of a light beam incident on the PSD 54 when the relative position of the LED 51 and the PSD 54 changes. The relationship between the detection position of a light beam incident on the position sensing device (PSD) and the relative position of the light emitting diode (LED) will now be described in detail below with reference to FIG. 12.

As shown in FIG. 12, a distance $D1_L$ ($D1_S$) is the length between the LED 51 positioned at point A (point B) and a light receiving surface 54a of the PSD 54. The distance $D1_L$ is longer than the distance $D1_S$. Moreover, a light beam $L_L$ ($L_S$) emitted from the LED 51 positioned at point A (point B) passes through a slit 52a and is incident on the light receiving surface 54a. A point O is a center position of the detection direction of the PSD 54. The slit position X is the distance the center position of the slit 52a has moved from the point O. The detection position $P_L$ ($P_S$) is the distance from the point O to the centroid of the light beam $L_L$ ($L_S$) on the light receiving surface 54a of the PSD 54. A perpendicular N is an imaginary perpendicular to the light receiving surface 54a of the slit plate 52, and is a straight line through the center of the slit 52a. The angle of incidence $\alpha_L$ ($\alpha_S$) is an angle a light beam incident on the center of the slit 52a makes with the imaginary perpendicular N.

As shown in FIG. 12, the detection position $P_L$ and the detection position $P_S$ do not coincide with each other, and the slit position X does not coincide with the respective detection positions $P_L$, $P_S$. In particular, when the positional relationship of the LED 51 and the PSD 54 becomes closer, the angle of incidence $\alpha_S$ becomes greater than the angle of incidence $\alpha_L$. The error of the detection position $P_L$ and the slit position X is marked. When the slit position X is to be found by a position detection device 54 as shown in FIG. 12, the actual slit position X and the detection positions $P_L$, $P_S$ do not coincide. Accordingly, as the slit position X becomes larger, the error of the position X and the detection positions $P_L$, $P_S$ becomes large in proportion to the amount of movement of the slit plate 52. Moreover, the error between the actual slit position X and the detection positions $P_L$, $P_S$ becomes larger as the distance between the LED 51 and the PSD 54 becomes shorter.

FIG. 13 is a graph showing the centroid position of the light incident on the PSD 54 from the LED 51 with respect to the slit position X. As shown in FIG. 13, the abscissa represents the slit position X and the ordinate represents the result when the centroid position of the light beam incident on the PSD 54 is calculated based on the output signal of the PSD 54. The full line $P_L$ represents the result of calculation of the centroid position when the LED 51 is positioned at the point A shown in FIG. 12; the full line $P_S$ represents the result of calculation of the centroid position when the LED 51 is positioned at the point B shown in FIG. 12. Furthermore, the origin O is the center position of the detection position of the PSD 54; and, the broken line represents the center position of the slit 52a. As shown in FIG. 13, according to the output of the PSD 54, the respective detection positions $P_L$, $P_S$ and the slit position X do not coincide. Thus, the greater the slit position X with respect to the center of the PSD 54, and the shorter the distance between the LED 51 and the PSD 54, the greater the error of the respective detection points $P_L$, $P_S$ and the slit position X.

Moreover, the error between the respective detection points $P_L$, $P_S$ and the slit position X becomes large in proportion to the amount of movement of the slit 52a when the range of the slit position X becomes large, and the light incident from the LED 51 does not impinge on the light receiving surface 54a of the PSD 54. Because of the error between the detection points $P_L$, $P_S$ and the slit position X, when the slit position X exceeds the effective range of the slit position X, as shown in FIG. 13, the results of calculation of the centroid position based on the output of the PSD 54 with respect to the movement of the slit plate 52 become disproportionately distorted. More particularly, the range of the detection positions $P_L$, $P_S$ detected by the PSD 54, which is in a proportional relationship with respect to the movement of the slit plate 52, becomes narrow. Further, the range in which position detection is possible becomes limited to the case in which the slit position X is small (i.e., a small amount of movement). The range in which position detection is possible tends to become narrower as the distance between the PSD 54 and the slit plate 52 becomes narrower.

When position detection is performed in the above-described manner, a problem occurs in a position detection device which uses a slit plate 52 in that the effective stroke of the slit plate 52 in which position detection is possible changes according to the distance between the PSD 54 and the LED 51.

Furthermore, when the LED 51 and PSD 54 are positioned close to each other, the conventional position detection device receives many effects of the profile of the light emitting device, causing a fall in the linearity of the position calculation results. As a result of the fall in linearity of the position calculation results, when the relative positional relationship of the LED 51 and the PSD 54 is close, the effective range of the slit plate 52 becomes short, and the error between the actual position of the motion compensation lens and the detection positions $P_L$, $P_S$ detected by the PSD 54 becomes large.

On the other hand, the problems described above with respect to the conventional position detection device can be reduced by making the distance between the LED 51 and the slit plate 52 large. However, when the distance between the LED 51 and the slit plate 52 is large, the position detection device becomes larger in size, resulting in a large size of a motion compensation unit, and, as a result, there is a problem of increased size of a camera. Compactness is strongly demanded in cameras, and therefore it is necessary to make the distance between the LED 51 and PSD 54 small in order achieve a compact design. More particularly, in a collapsible lens barrel type of camera in which the optical system is maintained in a collapsible lens barrel, the space between the LED 51 and the PSD 54 has to be set at the time of a motion compensation operation when the barrel is collapsed, resulting in a limitation on designing a camera of reduced size.

Moreover, when the light source is remote from the light receiving element, the amount of light incident on the light receiving element is of course insufficient. Because of the insufficient light, when performing signal processing, the signal to noise ratio S/N becomes poor, and, as a result, position detection errors occur.

The relationship between the drive amount (shift amount) of the motion compensation optical system and the compensation amount in the image plane of the conventional motion compensation device will now be described below. The drive amount of the motion compensation optical system and the movement amount of the image in the image plane are not necessarily in agreement. In order to correct motion in the image plane, when a drive amount $d_s$ of the motion compensation optical system results in a movement amount (motion compensation amount) $d_i$ of the image in the image plane, the following equation generally holds:

$$d_i = d_s \times K,$$

where the constant K is an antivibration compensation coefficient. The antivibration compensation coefficient K is an optically determined numerical value, and for the same lens, or lens group, changes according to the focal distance. In a zoom lens, the value of the antivibration compensation coefficient K generally becomes larger toward the TELE side having a long focal distance, and becomes smaller toward the WIDE side having a shorter focal distance. In order to compensate for motion in the image plane, the motion compensation device shifts the motion compensation optical axis according to the focal distance.

In a zoom lens, assuming that the antivibration compensation coefficient K is 2.0 at the TELE end and 0.8 at the WIDE end, when it is desired to move the optical axis 50 $\mu$m in the image plane, the following shift amounts (drive amounts) of the motion compensation optical system are necessary:

TELE end: 50/2.0=25.0 $\mu$m

WIDE end: 50/0.8=62.5 $\mu$m.

Therefore, in order to compensate for the same motion of 50 $\mu$m in the image plane at the TELE end and the WIDE end of the zoom lens, it is necessary to drive the motion compensation optical system by a smaller drive amount at the TELE end than at the WIDE end. As a result, it is necessary to drive the motion compensation optical system with greater accuracy when the lens is at the long focal distance (TELE) side than at the short focal distance (WIDE) side, and it is also necessary to detect the position of the motion compensation optical system with greater accuracy.

However, in the prior art motion compensation devices, drive control of the motion compensation optical system is at the same accuracy at both the TELE side and the WIDE side. Because of this, a problem occurs in that when accurate drive control of the motion compensation optical system is performed on the TELE side, the accuracy of drive control becomes excessive on the WIDE side. On the other hand, when drive control of the motion compensation optical system is matched to the accuracy of the WIDE side, a problem occurs in that the accuracy on the TELE side is insufficient.

SUMMARY OF THE INVENTION

It is an object of the present invention to provide a lens barrel and motion compensation device which can accurately perform motion compensation and which permits a small size camera to be designed.

Another object of the present invention is to provide a lens barrel and motion compensation device which can accurately compensate for motion causing image blur, and can automatically adjust the position detection accuracy of a position detection unit to a detect a position of a motion compensation lens.

Objects and advantages of the present invention are achieved in accordance with a first preferred embodiment of the present invention with a lens barrel comprising a motion compensation optical system to compensate for motion causing image blur; a movable tube which extends at a time of photography and retracts at a time of non-photography; a motion compensation optical system position detection unit to detect the position of the motion compensation optical system, the motion compensation optical system position detection unit including a light emitting unit to project light, a light position detection unit to receive light from the light emitting unit and to detect a light receiving position, wherein the light emitting unit and the light position detection unit are supported at one end by the movable tube and at another end by a fixed unit; and a distance varying unit to vary the distance between the light emitting unit and the light position detection unit by moving the movable tube.

In accordance with the first preferred embodiment of the present invention, the motion compensation optical system position detection unit may further comprise a light screening member between the light emitting unit and the light position detection unit, the light screening member having at least one light passage unit through which at least a portion of the light from the light emitting unit passes, wherein the distance varying unit lengthens the distance between the light emitting unit and the light position detection unit according to the extending operation of the movable tube, to make smaller an angle between a light ray incident on the light passage unit and a line perpendicular to the light passage unit.

In accordance with the first preferred embodiment of the present invention, the distance varying unit shortens the distance between the light emitting unit and the light position detection unit according to a retraction operation of the movable tube.

In accordance with the first preferred embodiment of the present invention, when the movable tube is maximally retracted the lens barrel is shortest.

In accordance with the first preferred embodiment of the present invention, the distance varying unit varies a distance between the light emitting unit and the light position detection unit according to a retraction operation of the movable tube.

In accordance with the first preferred embodiment of the present invention, the movable tube extends to a position in which photography is possible from a maximally retracted position, and a zooming operation is performed from the position in which photography is possible.

In accordance with the first preferred embodiment of the present invention, the motion compensation device includes a moving unit which moves in the optical axis direction and supports at least a portion of a photographic optical system, and a fixed unit which supports the moving unit in a freely movable state, wherein the lens barrel, the light emitting unit and the light position detection unit are supported on one side by the moving member, and are supported on another side by the fixed unit.

Objects and advantages of the present invention are achieved in accordance with a second preferred embodiment of the present invention with a motion compensation device comprising a motion compensation optical system to compensate for motion causing image blur, the motion compensation optical system comprising at least a portion of a photographic optical system; a motion compensation optical system position detection unit to detect the position of the motion compensation optical system, wherein the motion compensation optical system position detection unit includes a light emitting unit to project light, a light position detection unit to receive light from the light emitting unit and to detect a position of the received light, and a distance varying unit to vary the distance between the light emitting unit and the light position detection unit.

In accordance with the second preferred embodiment of the present invention, the motion compensation optical system position detection unit may further comprise a light screening member between the light emitting unit and the light position detection unit, the light screening member including a light passage unit to pass at least a portion of the light from the light emitting unit, wherein the distance varying unit lengthens the distance between the light emitting unit and the light position detection unit to make smaller an angle between a light ray incident on the light passage unit and a perpendicular line through the light passage unit.

In accordance with the second preferred embodiment of the present invention, the distance varying unit varies the distance between the light emitting unit and the light position detection unit according to movement in an optical axis direction of an optical system which comprises at least a portion of a photographic optical system.

Objects and advantages of the present invention are achieved in accordance with a third preferred embodiment of the present invention with a motion compensation device comprising a motion compensation optical system to compensate for motion causing image blur; a motion compensation optical system drive unit to drive the motion compensation optical system; a motion compensation optical system position detection unit to detect a position of the motion compensation optical system, wherein the motion compensation optical system position detection unit includes a light emitting unit to project light, a light position detection unit to receive light from the light emitting unit and to detect a position of the received light, and a light screening member between the light emitting unit and the light position detection unit, having a light passage unit to pass at least a portion of the light from the light emitting unit, and a distance varying unit to vary the distance between the light emitting unit and the light position detection unit.

In accordance with the third preferred embodiment of the present invention, the distance varying unit varies the distance between the light emitting unit and the light position detection unit according to a zooming operation.

In accordance with the third preferred embodiment of the present invention, the distance varying unit shortens the distance between the light emitting unit and the light position detection unit when a focal distance is short, and lengthens the distance between the light emitting unit and the light position detection unit when the focal distance is long.

In accordance with the third preferred embodiment of the present invention, the distance varying unit makes smaller an angle between a light ray incident on the light passage unit and a line perpendicular to the light passage unit by lengthening the distance between the light emitting unit and the light position detection unit.

In accordance with the third preferred embodiment of the present invention, for a constant motion compensation amount, the motion compensation optical system drive unit drives the motion compensation optical system a greater amount for a shorter focal distance.

In accordance with the third preferred embodiment of the present invention, the distance varying unit includes a focal distance detection unit to detect a focal distance, a position detection system drive unit to drive one of the light emitting unit and the light position detection unit, and a drive control unit to control the position detection system drive unit according to the detection result of the position detection unit.

In accordance with the third preferred embodiment of the present invention, the focal distance detection unit may be a zoom encoder.

In accordance with the third preferred embodiment of the present invention, the light emitting unit includes a light amount adjustment unit to vary an amount of light projected by the light emitting unit according to the focal distance.

In accordance with the third preferred embodiment of the present invention, the light amount adjustment unit makes the amount of light projected by the light emitting unit greater as the focal distance increases.

In accordance with the third preferred embodiment of the present invention, the light amount adjustment unit includes a position detection system position relation detection unit to detect the position of the light emitting unit and/or the light position detection unit, and a light amount varying unit to vary the amount of light projected by the light emitting unit according to the detection result of the position detection system position relation detection unit.

In accordance with the third preferred embodiment of the present invention, the light amount adjustment unit includes a light amount varying unit to vary the amount of light projected by the light emitting unit based on the output signal of the light position detection unit.

In accordance with the third preferred embodiment of the present invention, the light amount adjustment unit includes a focal distance detection unit to detect a focal distance, and a light amount varying unit to vary the amount of light projected by the light emitting unit according to a focal distance detected by the detection unit.

Objects and advantages of the present invention are achieved in accordance with a fourth preferred embodiment of the present invention with a motion compensation device comprising a motion compensation optical system to compensate for motion causing image blur; a motion compensation optical system drive unit to drive the motion compensation optical system; a motion compensation optical system position detection unit to detect a position of the motion compensation optical system, wherein the motion compensation optical system position detection unit includes a precision varying unit to change the precision of position detection by the motion compensation optical system position detection unit according to a focal distance.

In accordance with the fourth preferred embodiment of the present invention, the precision varying unit reduces the precision of position detection by the motion compensation optical system position detection unit when the focal distance is short, and increases the precision of position detection by the motion compensation optical system position detection unit when the focal distance is long.

In accordance with the fourth preferred embodiment of the present invention, the motion compensation optical system position detection unit includes a light emitting unit to project light; a light position detection unit to receive light from the light emitting unit and to detect a position of the received light; and a light screening member between the light emitting unit and the light position detection unit having a light passage unit to pass at least a portion of the light from the light emitting unit.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1A:
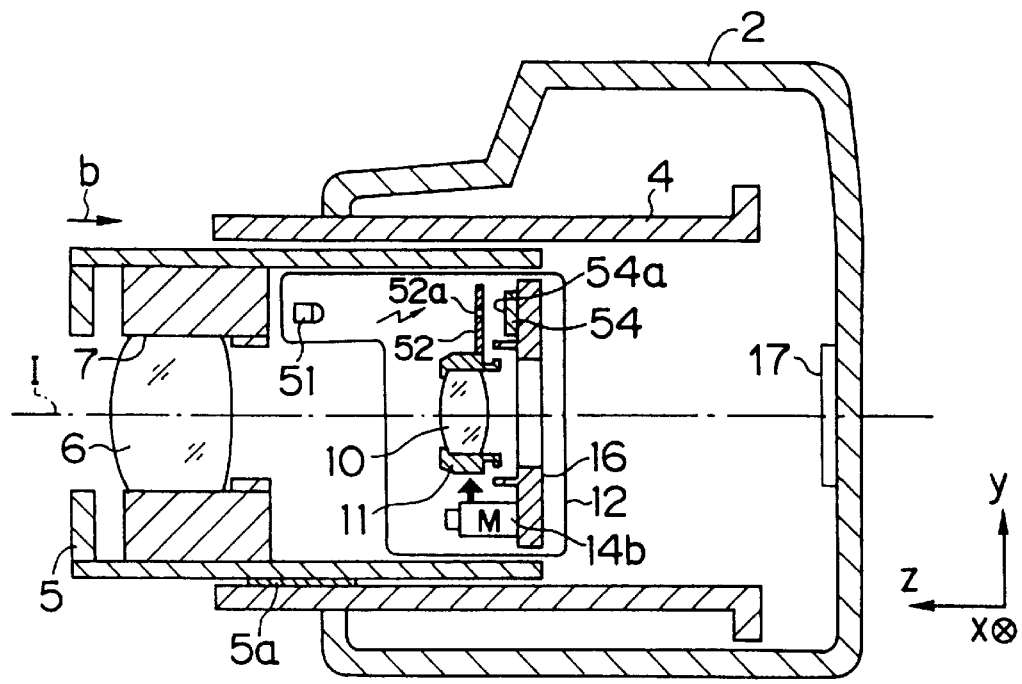
FIGS. 1A and 1B are cross-sectional diagrams of a camera having a motion compensation device in accordance with a first embodiment of the present invention.

Reference will now be made in detail to the preferred embodiments of the present invention, examples of which are illustrated in the accompanying drawings, wherein like reference numerals refer to like elements throughout.

First Preferred Embodiment

A first preferred embodiment of the present invention will now be described hereinbelow with reference to FIGS. 1–3.

Figure 1B:
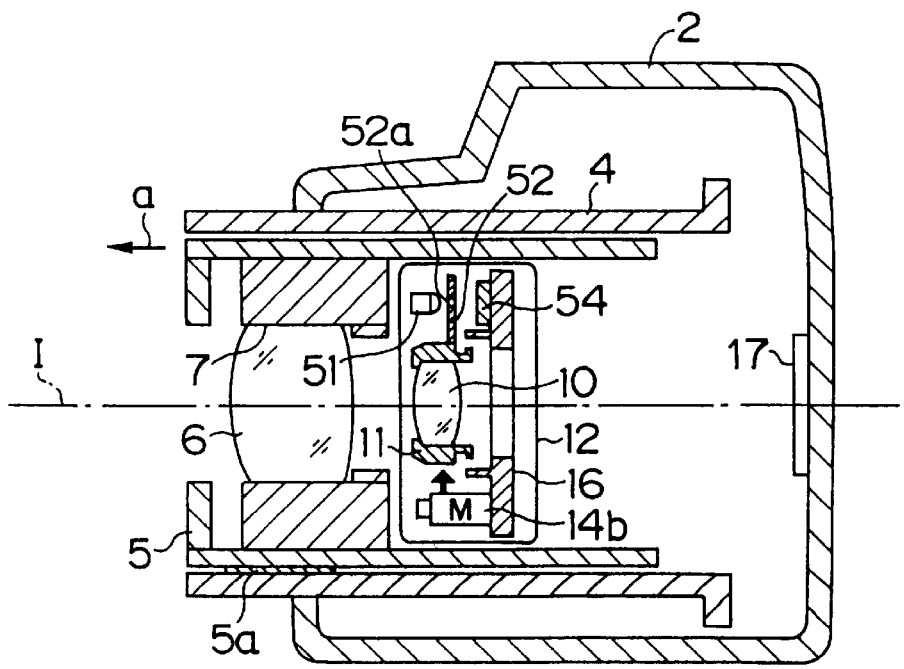
Figure 2:
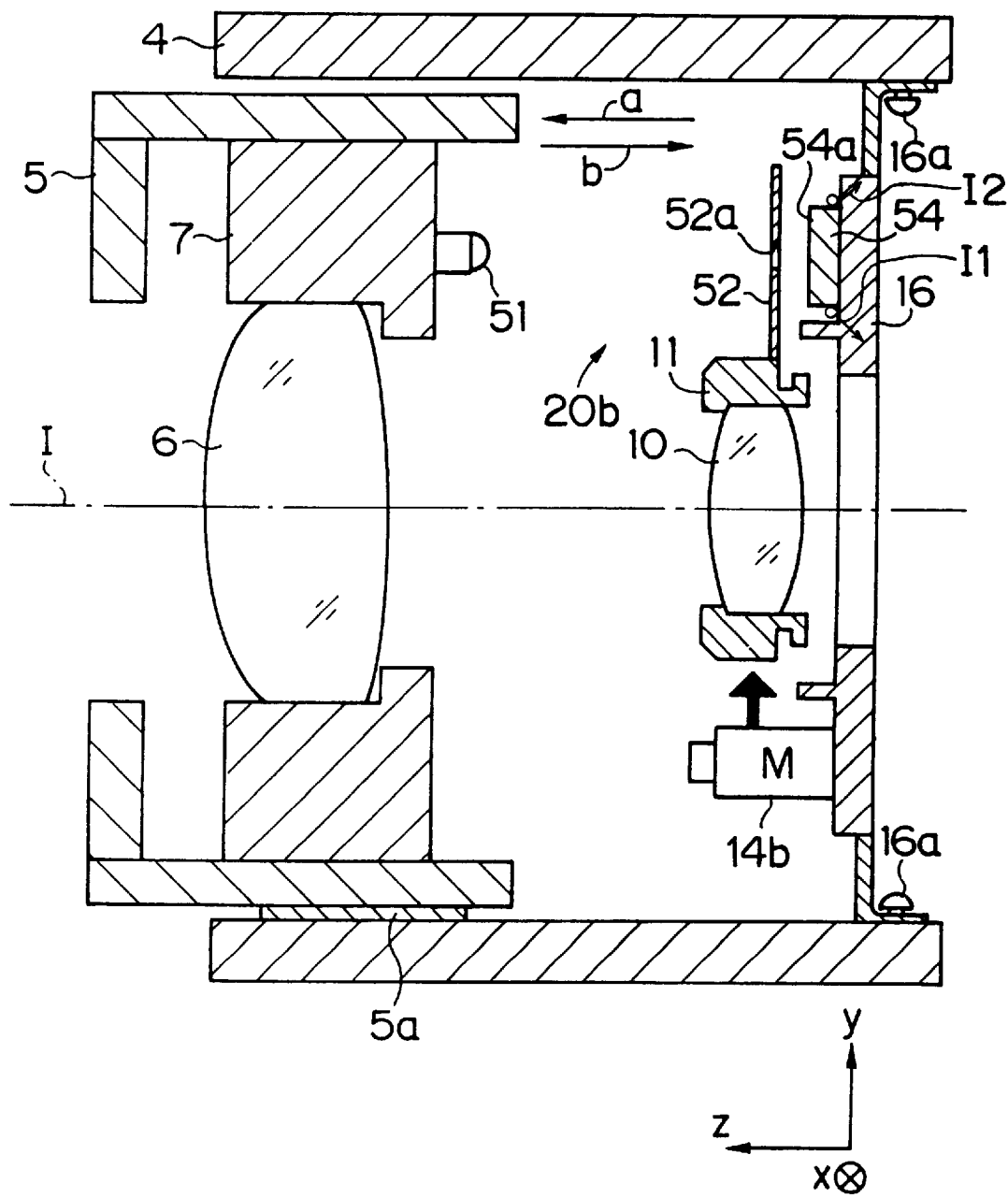
FIG. 2 is a cross-sectional diagram of a lens barrel having a motion compensation device in accordance with the first embodiment of the present invention.

FIGS. 1A and 1B are cross-sectional diagrams of a camera having a motion compensation device in accordance with the first preferred embodiment of the present invention. More specifically, FIG. 1A is a cross-sectional diagram of a camera having a motion compensation device and lens barrel with a movable tube, showing a state of the movable tube when extended from a collapsed state; and FIG. 1B is a cross-sectional diagram of the camera shown in FIG. 1A showing a state of the movable tube when extended from the photographic preparatory state. FIG. 2 is a cross-sectional diagram of a lens barrel having a motion compensation device in accordance with the first preferred embodiment of the present invention. FIG. 3 is a block diagram of a motion compensation device in accordance with the first embodiment of the present invention.

A motion compensation device 12 compensates for motion of an image plane causing image blur occurring as a result of motion of the camera caused by, for example, hand shake, or the like, at the time of photography. The motion compensation device causes the optical axis I to change by shifting a portion of a photographic optical system or the whole of the photographic optical system within a plane perpendicular to, or approximately perpendicular to, the optical axis I. As shown in FIG. 3, the motion compensation device 12 includes a motion detection circuit 30, a CPU 3, a motor drive circuit 13, motors 14a, 14b, a motion compensation lens 10, position detection devices 20a, 20b, and a position detection processing circuit 15.

The motion detection circuit 30 detects motion of the camera caused by, for example, hand shake or the like, and outputs motion detection information representative of the detected motion to the CPU 3. The motion detection circuit 30 uses, for example, two (2) angular velocity sensors to respectively detect angular velocities arising around an x-axis and around a y-axis as a result of hand shake and the like.

The CPU 3 is a one chip computer which calculates a motion compensation amount based on the motion detection information output by the motion detection circuit 30 and present position information output by the position detection processing circuit 15. The CPU 3 outputs drive signals to the motor drive circuit 13 according to the motion compensation amount calculated by the CPU 3 to drive the motors 14a, 14b.

The motors 14a, 14b drive the motion compensation lens 10 based on the output signals from the motor drive circuit 13. In particular, the motor 14a drives the motion compensation lens 10 in the x-axis direction, and the motor 14b drives the motion compensation lens 10 in the y-axis direction. Furthermore, the motor 14a is omitted from FIGS. 1 and 2.

The motion compensation lens 10 comprises a portion of the photographic optical system or the whole of the photographic optical system, and compensates for motion causing image blur by moving in two dimensions in a plane (the xy plane in the figures) at right angles to the optical axis I.

A motion compensation lens frame 11 supports the motion compensation lens 10. An outer circumference of the motion compensation lens 10 is fixed in an inner circumference of the motion compensation lens frame 11. A slit plate 52 is integrally mounted to the outer circumference of the motion compensation lens frame 11. The position of the motion compensation lens 10 is detected in accordance with light received by a light receiving surface 54a of a one-dimensional PSD 54, which light is projected toward the slit plate 52 from an LED 51.

Figure 3:
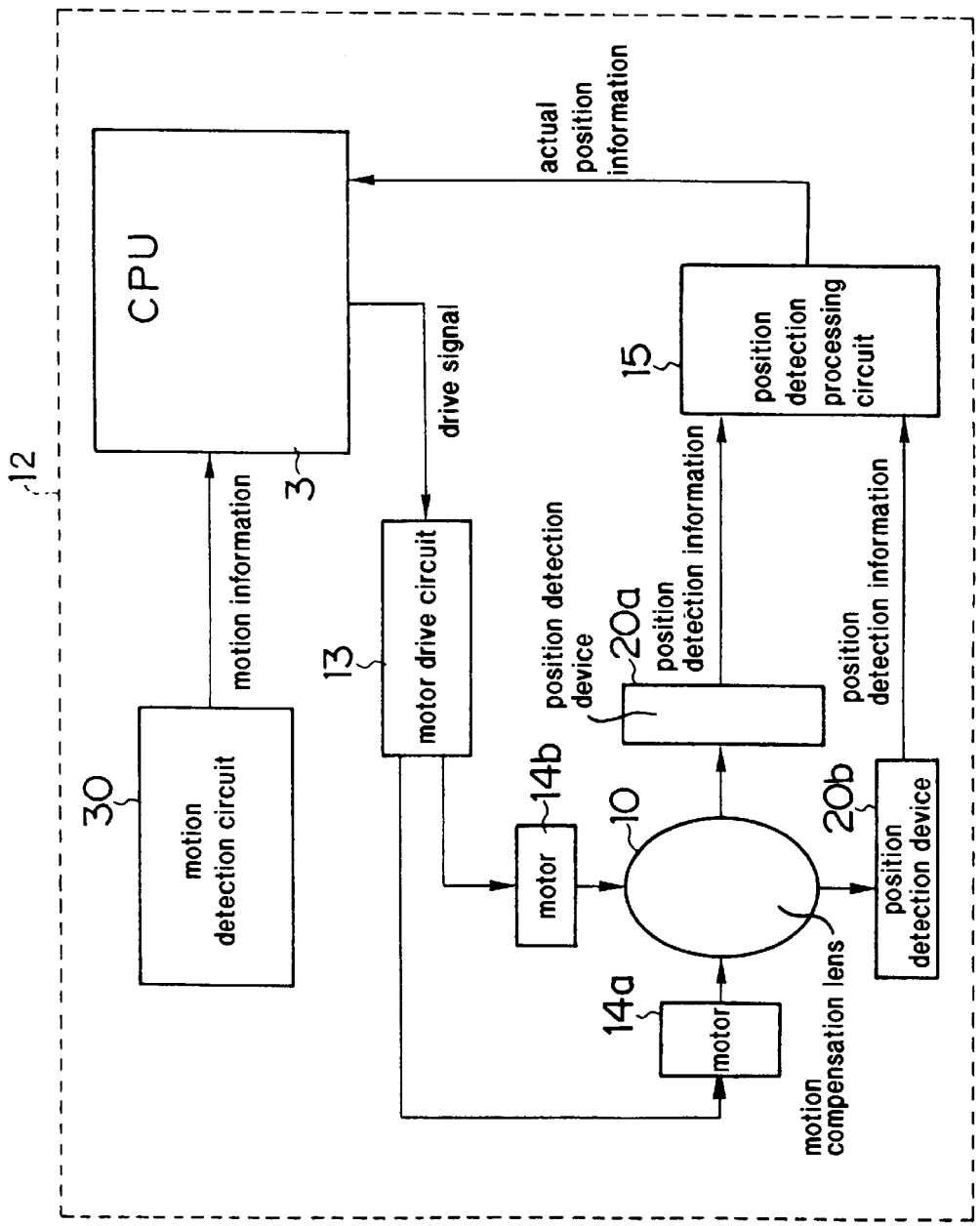
FIG. 3 is a block diagram of a motion compensation device in accordance with the first embodiment of the present invention.

As shown in FIG. 3, the position detection processing circuit 15 outputs to the CPU 3 information representing an actual position of the motion compensation lens 10 based on the position detection information output by the position detection devices 20a, 20b.

The position detection devices 20a, 20b detect the position of the motion compensation lens 10 in the xy plane. More specifically, the position detection devices 20a, 20b detect the positions of the motion compensation lens 10 in the x-axis direction and the y-axis direction, respectively, and output position detection information to the position detection processing circuit 15. The position detection device 20a outputs the position of the motion compensation lens 10 in the x-axis direction, and the position detection device 20b outputs the position of the motion compensation lens 10 in the y-axis direction. Furthermore, the position detection devices 20a, 20b both have the same structure, and the position detection device 20a is omitted in FIGS. 1 and 2. Accordingly, in the following description, the motion compensation device is described with reference to the position detection device 20b shown in FIG. 2.

The position detection device 20b includes an LED 51 which projects light, a one-dimensional PSD 54 mounted on a fixed member 16 to detect a position of the light spot projected by the LED 51, and a slit plate 52 mounted on the motion compensation lens frame 11.

The slit plate 52 operates as a light beam restriction member to produce a sharp spot of light following the movement of a material object, such as the motion compensation lens 10, and causes the incidence position of the light incident on the PSD 54 to change. The slit plate 52 is arranged between the LED 51 and the PSD 54, and maintains a positional relationship parallel to the PSD 54, while moving in a predetermined range in the y-axis direction integrally with the motion compensation lens 10. The slit plate 52 includes a slotted hole (slit) 52a through which at least a portion of the light from the LED 51 passes, and which is formed in the x-axis direction. The PSD 54 detects the position of the light spot on the light receiving surface 54a. The image of the light projected onto the light receiving surface 54a is preferably as sharp as possible.

In operation of the position detection device 20b, light is projected from the LED 51 onto the light receiving surface 54a of the PSD 54 via the slit 52a of the slit plate 52, which moves in the y-axis direction. As shown in FIG. 2, the one-dimensional PSD 54 normally outputs two (2) signals I1, I2. The position detection device 20b detects a central position, in the y-axis direction, of the light beam incident on the PSD 54, and detects the position of the motion compensation lens 10 based on the central position. The CPU 3 controls driving of the motor 14b based on the calculated motion compensation amount and the position of the motion compensation lens 10 detected by the position detection device 20b, and the motion compensation lens 10 compensates for the motion causing image blur.

As shown in FIG. 1, a camera having a motion compensation device 12 in accordance with the first embodiment of the present invention comprises a camera body 2, a fixed tube 4, which is mounted integrally with the camera body 2, a first photographic lens 6 supported by the movable tube 5, and a mechanism which performs a collapsing operation of the movable tube 5.

The fixed tube 4 supports the movable tube 5 for free movement in the direction of the optical axis I. The fixed tube 4 does not move either during photography or during a time photography is not performed. The movable tube 5 is extended and retracted in the optical axis direction I, and supports the photographic optical system including the motion compensation lens 10.

A drive mechanism unit 5a is disposed between the fixed tube 4 and the movable tube 5, and drives the movable tube 5 in the optical axis I direction with respect to the fixed tube 4. The drive mechanism unit 5a includes, for example, a cam groove, a pin engaged and freely movable in the cam groove, a male helicoid screw unit, a female helicoid screw unit which mates with the male helicoid screw unit, and a motor which rotates the movable tube 5.

A holder 7 is fixedly mounted in the inner periphery of the movable tube 5. The holder 7 is a frame member to fix the first photographic lens 6. The outer periphery of the first photographic lens 6 is fixedly fitted into the inner periphery of the holder 7. As shown in FIG. 2, the LED 51 is mounted on the holder 7 on a surface facing toward the motion compensation lens 10.

The fixed member 16 is an annular member which supports the motor 14b and PSD 54. As shown in FIG. 2, the fixed member 16 is fixed to the inner periphery of the fixed tube 4 with mounting members 16a.

As shown in FIGS. 1A and 1B, an image plane 17 is a plane which receives an image formed by a light beam passing through the first photographic lens 6 and the motion compensation lens 10. For example, a silver salt or photoelectric conversion element (CCD) is arranged in the image plane 17.

Operations of extending and retracting the lens barrel in accordance with the first embodiment of the present invention will now be described below.

As shown in FIG. 1B, the movable tube 5 extends from a collapsed state in the direction of the arrow a in FIG. 1B by operation of the drive mechanism unit 5a. The extension operation of the movable tube 5 is performed together with the holder 7 fixed to the movable tube 5 and the LED 51, which move in the optical axis I direction following the extension operation of the movable tube 5. The PSD 54 is attached to the fixed tube 5 by the fixed member 16, and, as a result, the LED 51 becomes further from the PSD 54 as the extension operation of the movable tube 5 is performed. Because the LED 51 and PSD 54 become further apart as the extension of the movable tube 5 occurs, when the lens barrel is in the photographic state or photographic preparatory state shown in FIG. 1A, the relative distance between the PSD 54 and the LED 51 becomes long, and the angle of incidence $\alpha_L$ becomes small, close to 0°. As a result of lengthening the relative distance between the PSD 54 and the LED 51, the error between the slit position X and a detection position $O_L$ becomes small, the precision of detecting the position of the motion compensation lens 10 increases, and a motion compensation operation with good precision becomes possible.

As shown in FIG. 1A, the movable tube 5 retracts in the direction of the arrow b in FIG. 1A from the photographic position or photographic preparatory position by operation of the drive mechanism unit 5a. The LED 51 moves in the direction of the optical axis I following the retraction movement of the movable tube 5, and becomes close to the PSD 54. As a result, when the lens barrel is in the collapsed position (non-photographic position) shown in FIG. 1B, the relative distance between the PSD 54 and the LED 51 becomes shorter. More particularly, when the movable tube 5 is in its most retracted state, the distance between the PSD 54 and the LED 51 becomes a minimum, the length of the whole lens barrel becomes shortest, and the camera can be designed to be more compact.

The lens barrel and motion compensation device in accordance with the first preferred embodiment of the present invention have the following effects.

As shown in FIG. 1A, at a motion compensation time or at a time when motion compensation is required (for example, at a time of photographic operation or photographic preparatory operation), the movable tube 5 is extended and projects from the fixed tube 4. When the movable tube 5 is in the extended state, because the relative distance between the PSD 54 and the LED 51 becomes longer, by appropriately maintaining this distance, position detection of the motion compensation lens 10 is performed with high precision, and motion causing image blur can be compensated precisely.

Alternatively, when the camera is in a non-photographic state, it is not necessary to make the relative distance between the PSD 54 and the LED 51 long in order to precisely perform motion compensation. Because of this, the distance between the PSD 54 and the LED 51 becomes unnecessary, and, as shown in FIG. 1B, the movable tube 5 retracts into the fixed tube 4. As a result, the unnecessary space between the PSD 54 and the LED 51 is reduced, and a camera having a small design is possible in which the photographic optical system is compactly accommodated within the fixed tube 4.

Second Preferred Embodiment

Figure 4A:
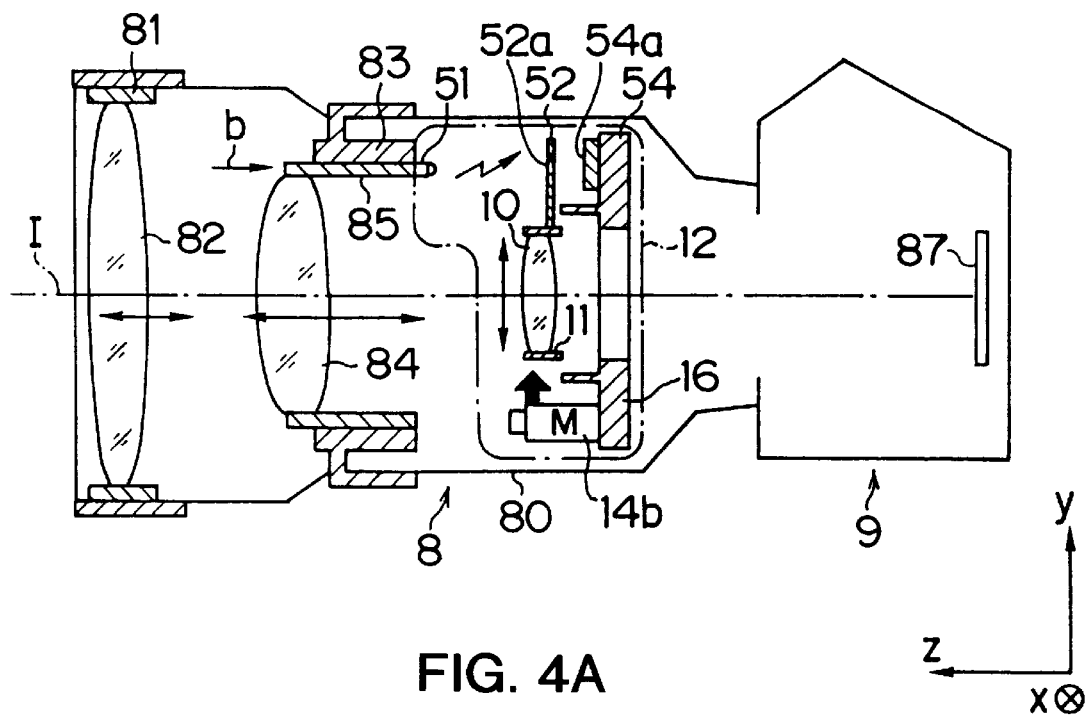
FIGS. 4A and 4B are cross-sectional diagrams of a camera system having a motion compensation device in accordance with a second embodiment of the present invention.
Figure 4B:
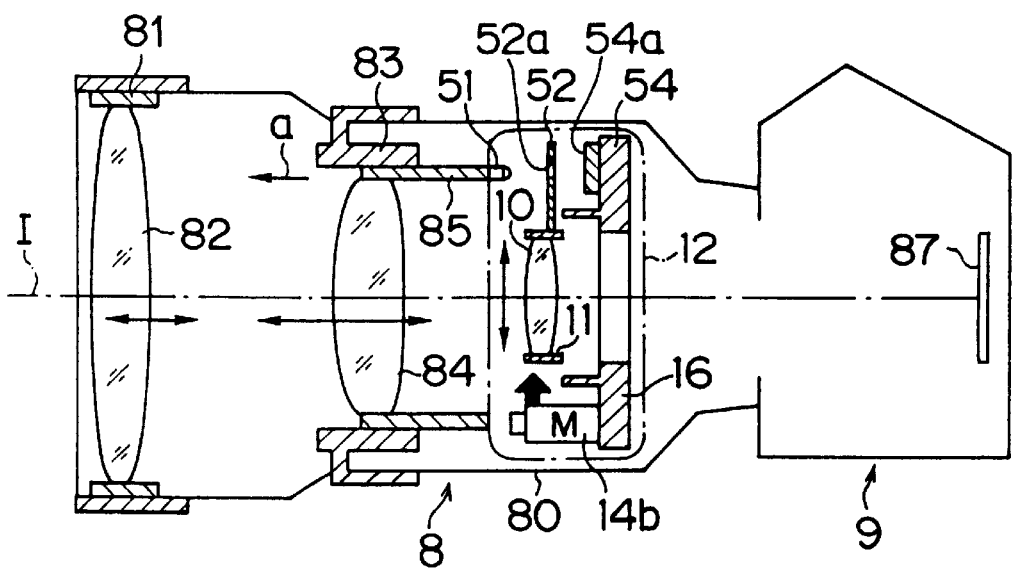

FIGS. 4A and 4B are cross-sectional diagrams of camera systems having a motion compensation device in accordance with a second preferred embodiment of the present invention. More particularly, FIG. 4A is a cross-sectional diagram of a camera having a zoom optical system in the TELE position, and FIG. 4B is a cross-sectional diagram of a camera having a zoom optical system in the WIDE position. Elements which are the same as or similar to elements shown in FIGS. 1–3 and described hereinabove with respect to the first embodiment of the invention are hereinafter referred to by the same reference numbers, and a detailed description of the like elements will not repeated here.

As shown in FIGS. 4A and 4B, a lens barrel 8 is an interchangeable lens having a zoom function. The lens barrel 8 is mounted in a freely removable state on the camera body 9. The lens barrel 8 comprises a focus optical system 82 which adjusts focus, a zoom optical system 84 which changes the focal distance, a motion compensation optical system 10, a focus cam tube 81, a zoom cam tube 83, a straight tube 85, and a motion compensation device 12. Furthermore, it is noted that the detailed lens configuration of the zoom optical system 84 is omitted from the figures.

The focus cam tube 81 has an internal cam groove, and focusing adjustment is performed by rotation of the focus cam tube 81 to move the focus optical system 82 with respect to the lens barrel 8. The focus cam tube 81 is supported by a fixed tube 80 to freely rotate in the fixed tube 80.

Zoom adjustment of the zoom optical system 84 is performed by rotating the zoom cam tube 83. More particularly, the zoom cam tube 83 has a cam groove which moves the straight tube 85 in the optical axis I direction with respect to the lens barrel 8 when the zoom cam tube 83 is rotated, thereby moving the zoom optical system 84 in the optical axis I direction. The zoom cam tube 83 is supported by the fixed tube 80 to freely rotate in the fixed tube 80.

The straight tube 85 supports the zoom optical system 84. The straight tube 85 moves integrally with the zoom optical system 84, coupled to the rotary actuation of the zoom cam tube 83, and the focal distance is changed by movement of the zoom optical system 84. The LED 51 is mounted on the straight tube 85 in a position facing the slit plate 52 and the PSD 54.

An image plane 87 is a flat surface which receives the image of light rays passing through the zoom optical system 84 and the motion compensation optical system 10. The image plane 87 comprises, for example, a silver salt film or photoelectric converting element (CCD).

The operation of the lens barrel in accordance with the second preferred embodiment of the present invention will now be described below.

When the zoom cam tube 83 rotates, the straight tube 85 extends in a direction of the arrow a from the state shown in FIG. 4B. The zoom optical system 84 moves integrally with the straight tube 85 in the optical axis I direction to perform zooming which changes the focal distance. The LED 51 moves in the optical axis I direction following the extension operation of the straight tube 85. Because the PSD 54 is fixed to the fixed tube 80 by the fixed member 16, the LED 51 becomes further from the PSD 54 with the extension operation of the straight tube 85. As shown in FIG. 4A, when the zoom optical system 84 moves to the left-hand side of the range of movement and is maximally extended, the zoom optical system 84 reaches the TELE end at which the focal distance is longest.

When the zoom optical system 84 is at the TELE end, it is necessary to determine the position of the motion compensation lens 10 with good precision. In a manner similar to that shown in FIG. 12, when the relative distance between the PSD 54 and the LED 51 is long, the angle of incidence $\alpha_L$ becomes small, close to 0°.

As a result, the difference between the slit position X and the detection position $P_L$ becomes small, the detection precision of the motion compensation lens 10 increases, and it becomes possible to compensate for motion causing image blur with good precision.

When the zoom cam 83 rotates in a reverse direction, the straight tube 85 retracts from the position shown in FIG. 4A in the direction of the arrow b in FIG. 4A. The LED 51 moves in the optical axis I direction following the retraction operation of the straight tube 85, becoming closer to the PSD 54. As shown in FIG. 4B, when the zoom optical system 84 moves to the right-hand side of the range of movement and is maximally retracted, the zoom optical system 84 reaches the WIDE end at which the focal distance is shortest.

Figure 12:
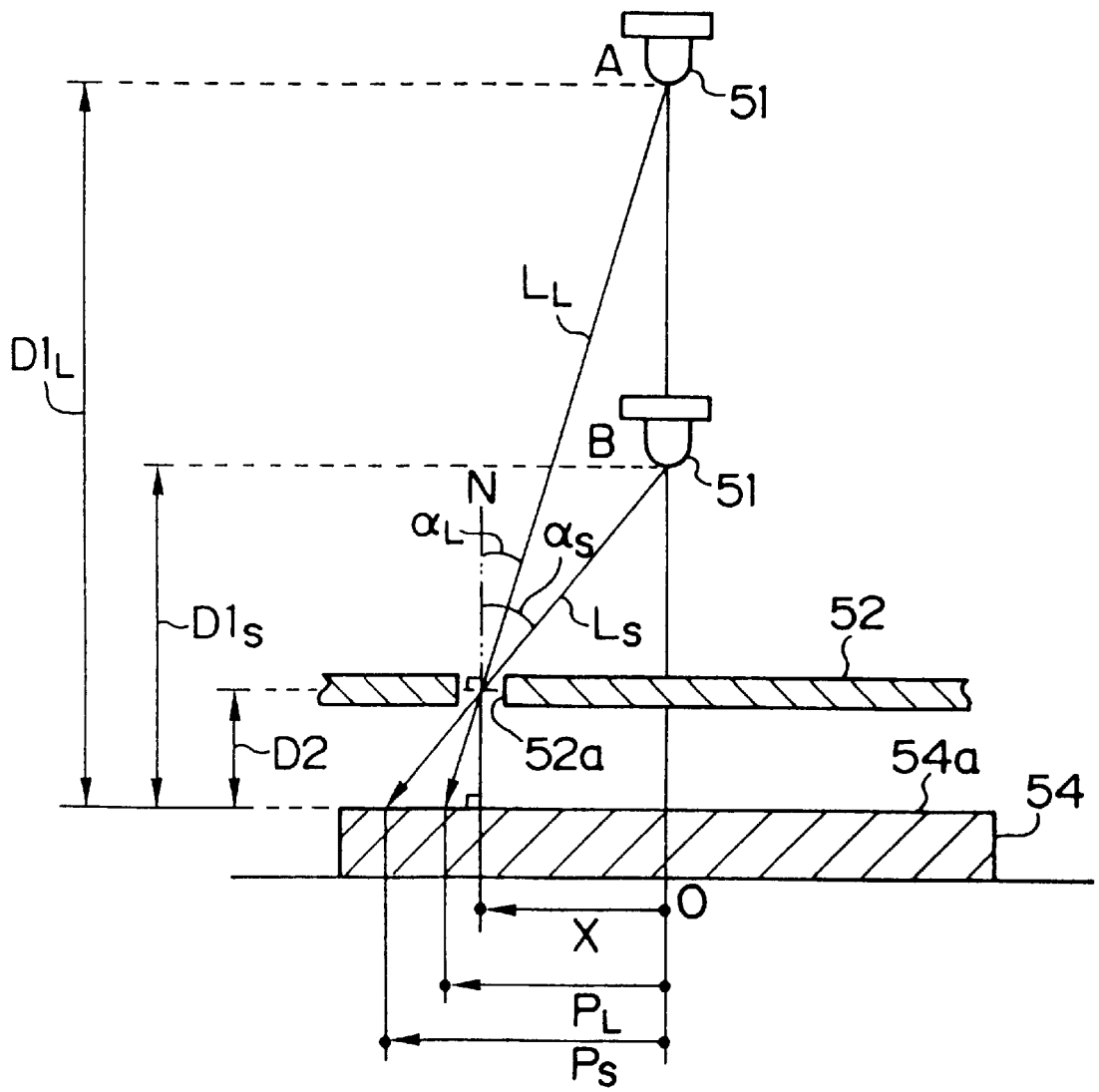
FIG. 12 is a schematic diagram showing the change of centroid position of a light beam incident on a PSD for a conventional position sensing device when the relative positional relationship of an LED and the PSD changes.
Figure 13:
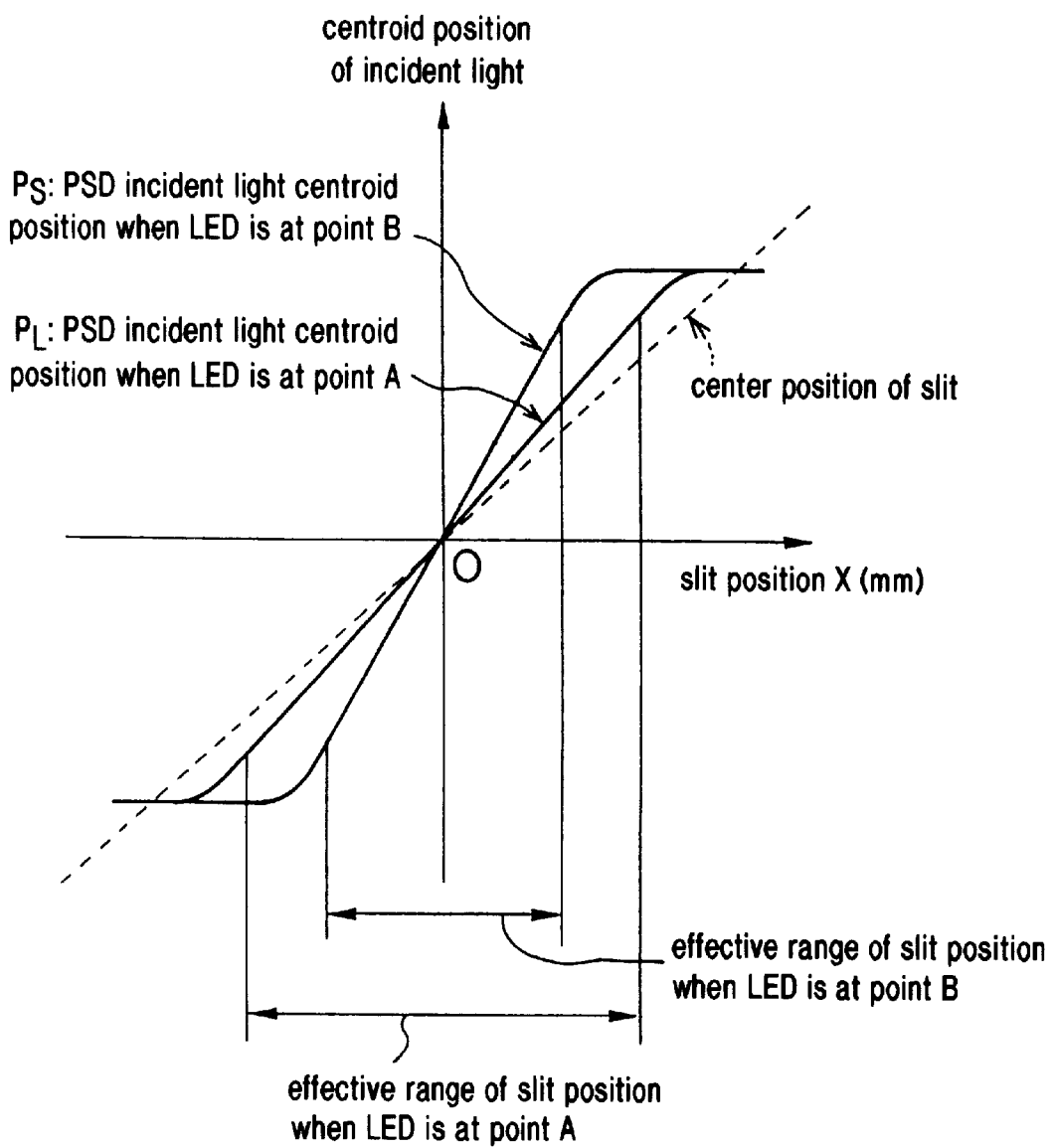
FIG. 13 is a graph showing a centroid position of an incident light beam with respect to the slit position for a conventional sensing device.

As a result, in a manner similar to that shown in FIG. 12, the relative distance between the PSD 54 and the LED 51 becomes small, and the angle of incidence $\alpha_S$ becomes large. Because of this, the difference between the slit position X and the detection position $P_S$ becomes large, and the detection precision of the motion compensation lens 10 decreases.

However, when the zoom optical system 84 is at the WIDE end, it is not necessary to detect the position of the motion compensation lens 10 with as good precision as when the zoom optical system 84 is at the TELE end. Because the detection precision of the motion compensation lens 10 need not be as precise at the WIDE end in comparison with the TELE end, it is not necessary to make the relative distance between the PSD 54 and the LED 51 wider than this, and the distance between the PSD 54 and the LED 51 is reduced as shown in FIG. 4B.

The lens barrel and motion compensation device described above with respect to the second preferred embodiment of the present invention have the advantageous effects discussed below.

Specifically, in accordance with the second embodiment of the present invention, the relative positional relationship of the LED 51 and PSD 54 can change according to the focal distance. As a result, the position detection precision of the motion compensation lens 10 can be automatically adjusted.

In accordance with the second embodiment of the present invention, the LED 51 is fixed in the straight tube 85 which moves in the optical axis I direction, and the PSD 54 is fixed to the fixed tube 80 by the fixed member 16. Because of this, the LED 51 is integral with the zoom optical system 84 and the straight tube 85 and moves with the zoom operation of the zoom optical system. Accordingly, the positional relationship of the LED 51 and the PSD 54 changes according to the zooming operation (focal distance). As a result, the position detection precision of the motion compensation lens 10 can be adjusted according to the zoom position of the zoom optical system 84.

In accordance with the second embodiment of the present invention, when the focal distance is long, the distance between the LED 51 and the PSD 54 is relatively longer. Accordingly, for a constant motion compensation amount, the amount of drive of the motion compensation lens 10 required to compensate for image blur is smaller for a longer focal distance than when the focal distance is short.

Because of this, when the focal distance is long, it is necessary to perform drive control of the motion compensation lens 10 with better precision. In accordance with the second embodiment of the present invention, when the focal distance is long, because the distance between the LED 51 and the PSD 54 is long, in a manner similar to that shown in FIG. 12, the angle of incidence $\alpha_L$ becomes small, nearly 0°.

As a result, the difference between the slit position X and the detection position $P_L$ becomes small, the precision of detection of the position of the motion compensation lens 10 increases, and it is possible to compensate motion causing image blur with good precision.

On the other hand, in accordance with the second embodiment of the present invention, when the focal distance is short, the distance between the LED 51 and the PSD 54 is shortened. Accordingly, for a constant amount of motion compensation in the image plane, the amount of drive of the motion compensation lens 10 required to compensate for image blur is greater for a shorter focal distance in comparison with when the focal distance is long.

Because of this, when the focal distance is short, it is not necessary to detect the position of the motion compensation lens 10 with high precision. In accordance with the first embodiment of the present invention, when the focal distance is short, the distance between the LED 51 and the PSD 54 is short.

Third Preferred Embodiment

Figure 5:
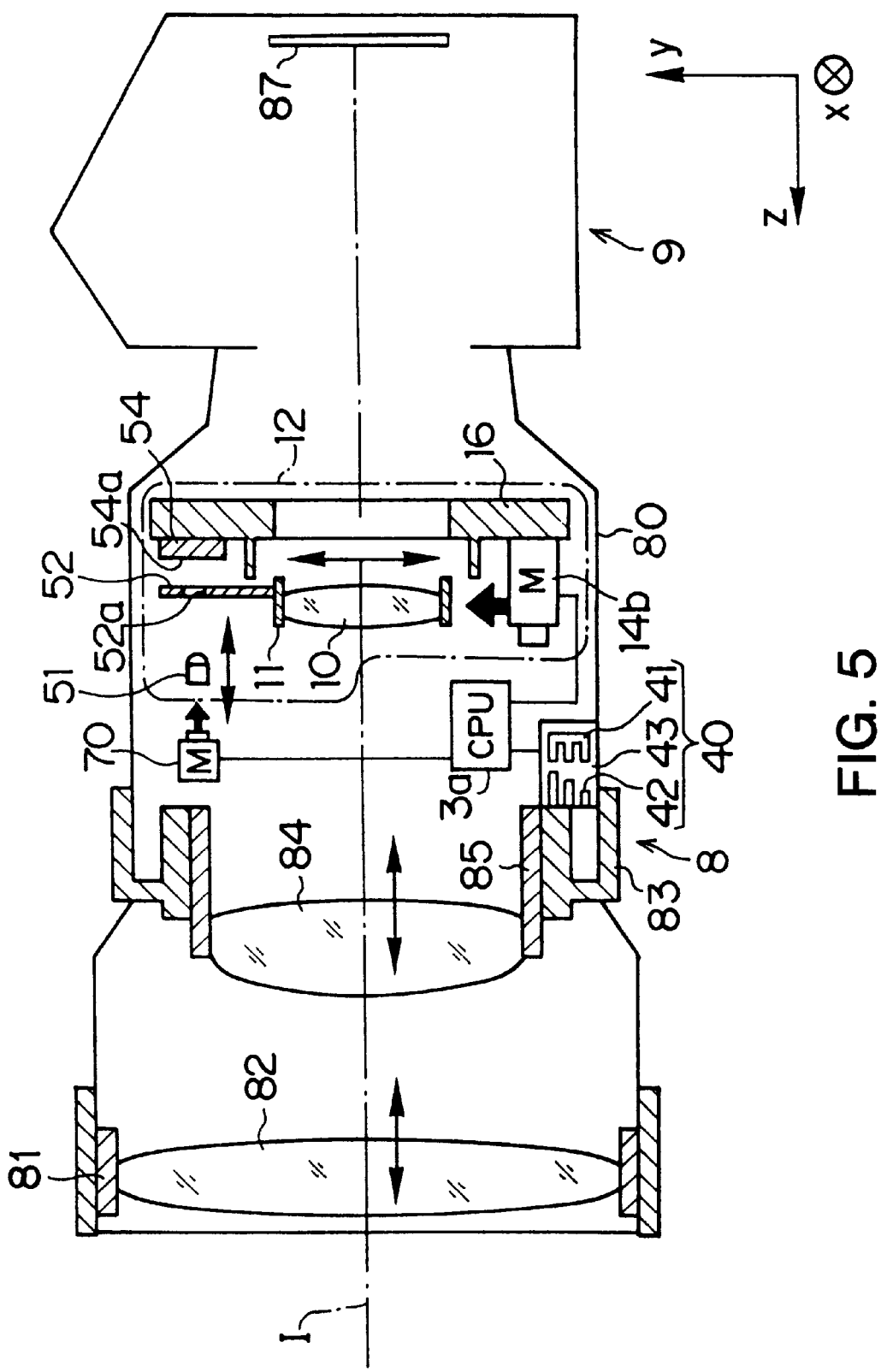
FIG. 5 is a cross-sectional diagram of a camera system having a motion compensation device in accordance with a third embodiment of the present invention.

FIG. 5 is a cross-sectional diagram of a camera system having motion compensation device in accordance with a third preferred embodiment of the present invention. Elements which are the same as or similar to elements shown in FIGS. 1–4 and described hereinabove with respect to the first and second embodiments are referred to by the same reference symbols and numerals, and a detailed description of the like elements will not be repeated here.

As shown in FIG. 5, a CPU 3a is a one chip computer which controls drive of a linear type actuator 70 based on zoom lens position information output by a zoom position detection unit 40 to control the focal distance and zoom adjustment by calculating a motion compensation amount. The CPU 3a is connected to the zoom position detection unit 40, the linear type actuator 70, the motor 14b and PSD 54 of the motion compensation device 12, and various kinds of motor control units (not shown in the figure). The CPU 3a outputs drive signals to the linear type actuator 70 to drive the LED 51 according to the focal distance.

The zoom position detection unit 40 is a zoom encoder which detects the position in the optical axis I direction of the zoom optical system 84 by reading a rotary position of the zoom cam tube 83. The zoom position detection unit 40 includes a plurality of brushes 41, which are disposed toward the fixed tube 80, a conductive pattern 42, which makes contacts with the brushes 41 and is disposed toward the zoom cam tube 83, and a flexible printed circuit board on a surface 43 on which the conductive pattern 42 is formed.

A zoom position detection unit 40 suitable for use with the present invention is disclosed, for example, in JP-A-8-5884, and its structure is briefly described hereinbelow.

When the zoom cam tube 83 rotates, the conductive pattern 42 moves, contacting the brushes 41. As a result, there is a change in the areas of the conductive portions of the conductive pattern 42 in which current flows, and the resistance value between the brushes 41 and the conductive pattern 42 changes. The zoom position detection unit 40 detects the change of resistance value between the brushes 41 and conductive pattern 42 as a change of voltage, and detects the rotary position of the zoom cam tube 83 with respect to the fixed tube 80 based on the change of voltage. The zoom position detection unit 40 then detects an amount of movement in the optical axis I direction of the zoom optical system 84 based on the amount of rotation, and detects the position (focal distance) of the zoom optical system 84. The zoom position detection unit 40 outputs to the CPU 3a zoom lens position information relating to the position of the zoom optical system 84.

The linear type actuator 70 is a motor which moves in a direction parallel to the optical axis I with respect to the fixed tube 80. The LED 51 is mounted at the front end of the linear type actuator 70, and the LED 51 is moved by the linear type actuator 70 according to the focal distance, based on the drive signals output by the CPU 3a. As a result, the LED 51 moves in the optical axis I direction following the movement of the linear type actuator 70.

Figure 6:
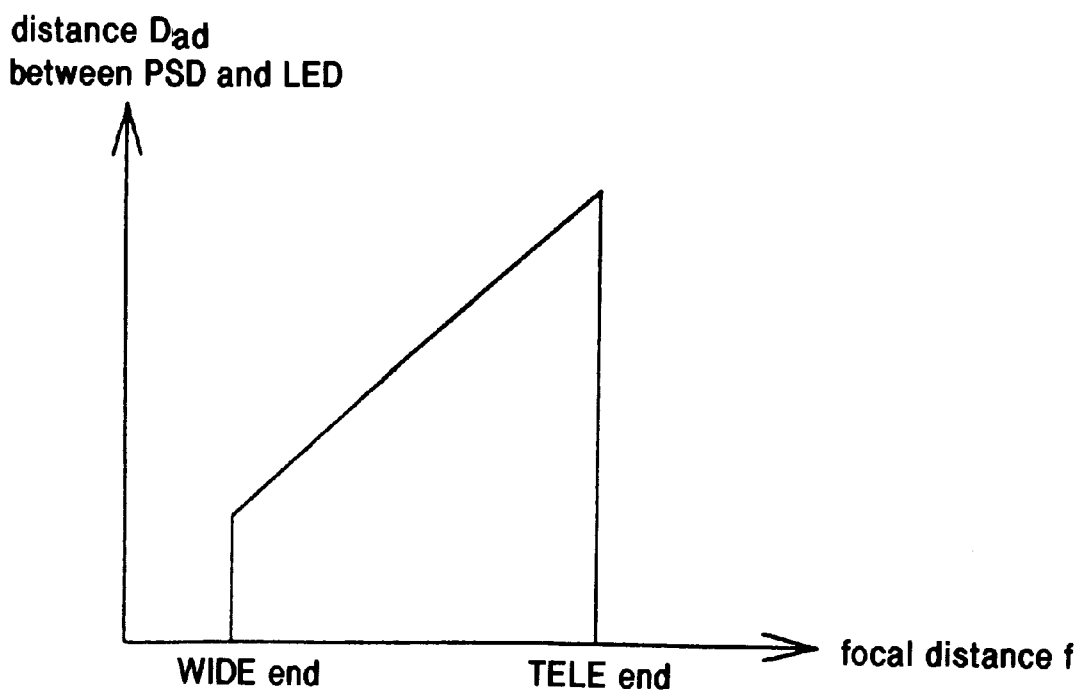
FIG. 6 is a diagram showing a relationship between the distance $D_{ad}$ between an LED and PSD and the focal distance f in a motion compensation device and lens barrel in accordance with the third embodiment of the present invention.

FIG. 6 is a graph showing a relationship between the distance $D_{ad}$ between the LED 51 and PSD 54 and the focal distance f in a motion compensation device and lens barrel in accordance with the third embodiment of the present invention. In FIG. 6, the focal distance f is represented on the abscissa and the distance $D_{ad}$ between the LED 51 and the PSD 54 is represented on the ordinate. The CPU 3a controls drive of the linear type actuator 70 so that the distance $D_{ad}$ is changed proportionally according to the focal distance f.

The motion compensation device and lens barrel in accordance with the third embodiment of the present invention have the following advantageous effects, in addition to the effects of the second embodiment of the invention.

More particularly, in accordance with the third embodiment of the present invention, the zoom position detection unit 40 detects the focal distance, and the linear type actuator 70 moves in the optical axis I direction integrally with the LED 51 according to the focal distance. As a result, the distance between the LED 51 and the PSD 54 can be precisely changed according to the focal distance, irrespective of the position of the zoom optical system 84.

Fourth Preferred Embodiment

Figure 7:
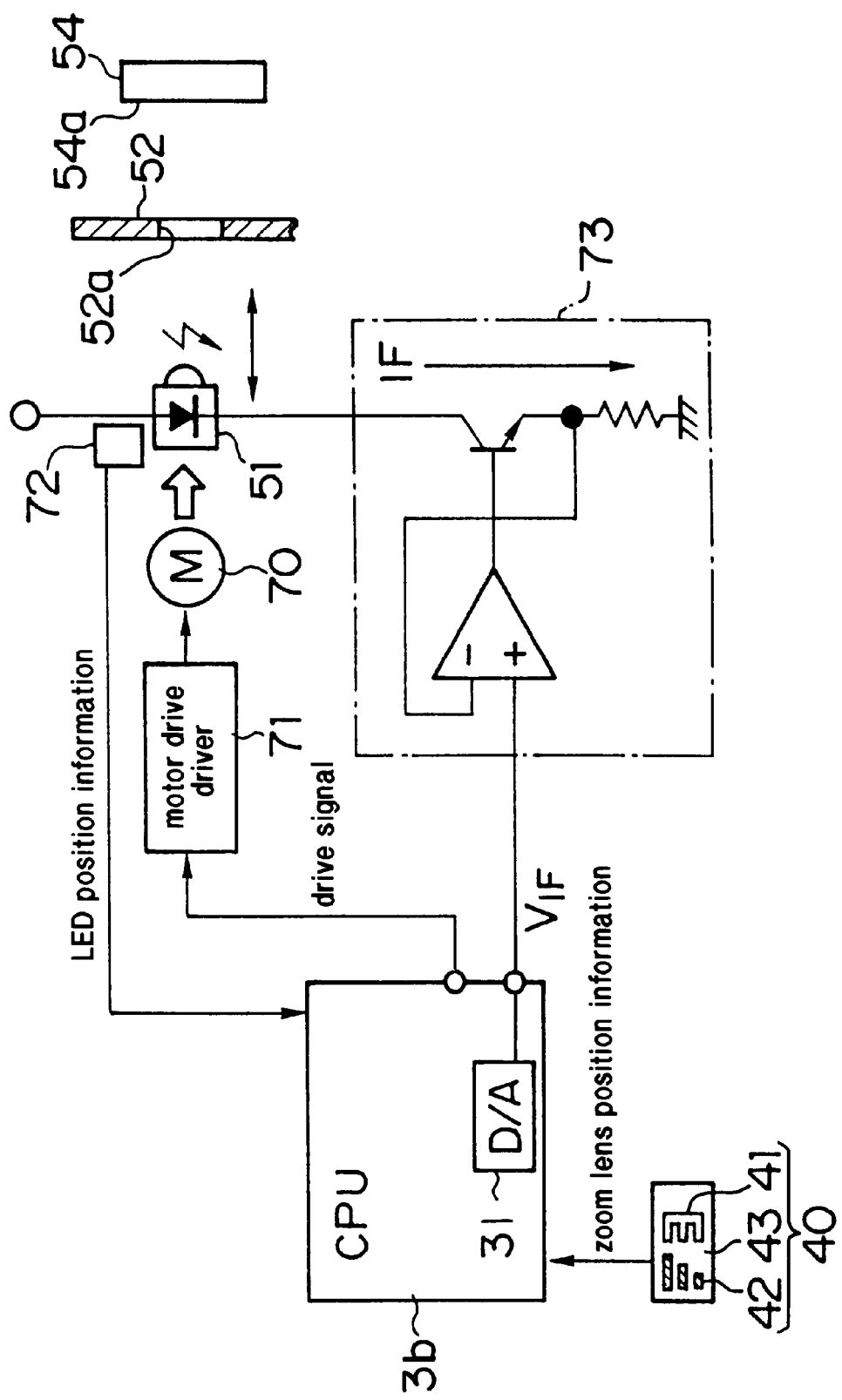
FIG. 7 is a block diagram of a light amount adjustment unit and an LED position detection unit in a motion compensation-device and lens barrel in accordance with a fourth embodiment of the present invention.

FIG. 7 is a block diagram of a light amount adjustment unit and an LED position detection unit in a motion compensation device and lens barrel in accordance with a fourth preferred embodiment of the present invention. Elements which are the same as or similar to elements shown in FIGS. 1–5 and described hereinabove with respect to the first through third embodiments of the present invention are referred to by the same reference symbols, and a detailed description of these like elements will not be repeated here.

As shown in FIG. 7, a motor drive driver 71, an LED position detection unit 72, and the light amount adjustment unit 73 are connected to a CPU 3b. The CPU 3b is a one chip computer which variably controls the light amount adjustment unit 73 and drive control of the linear type actuator 70 via the motor drive driver 71, based on the zoom position detection information output by the zoom position detection unit 40. The CPU 3b adjusts an output voltage $V_{IF}$ of a built-in D/A converter 31 based on LED position information output by the LED position detection unit 72, or based on the zoom lens position information output by the zoom position detection unit 40.

The light amount adjustment unit 73 variably adjusts an amount of light output by the LED 51 according to the focal distance. The light amount adjustment unit 73 adjusts the amount of light emitted by the LED 51 to be large when the distance between the LED 51 and PSD 54 has become large, so that the amount of light emitted by the LED 51 is not insufficient. The light output adjustment unit 73 adjusts the drive current IF of the LED 51 based on the voltage $V_{IF}$ output by the D/A converter 31.

Furthermore, the light amount adjustment unit 73 may apply an output voltage $V_{IF}$ to the LED 51, based on the zoom lens position information output by the zoom position detection unit 40.

Figure 8:
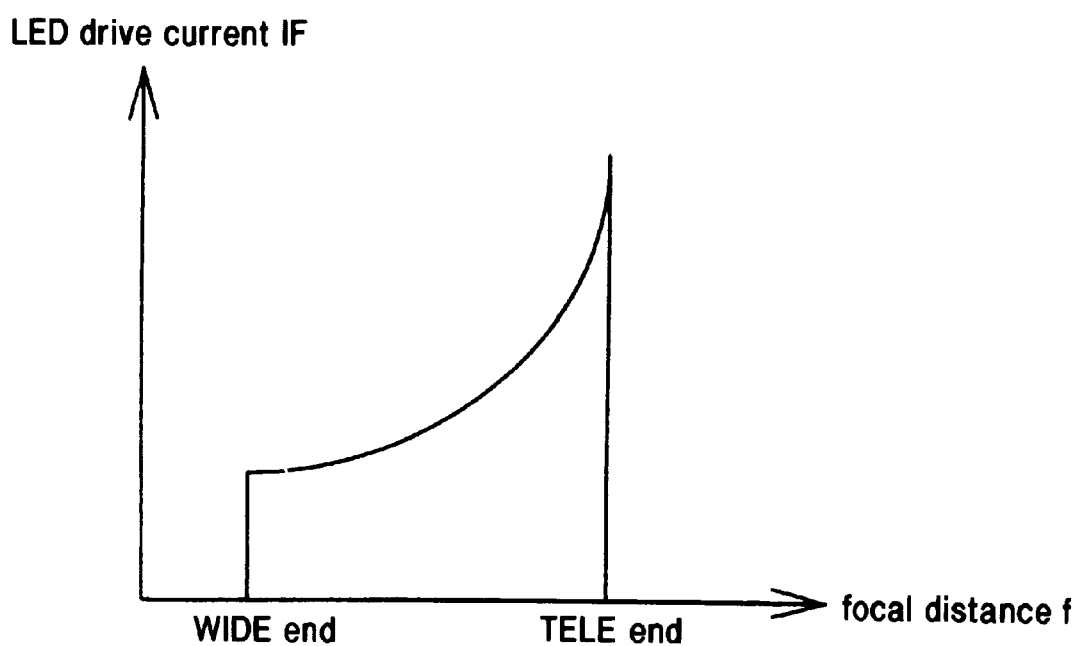
FIG. 8 is a diagram showing a relationship between an LED drive current IF and the focal distance f in a motion compensation device and lens barrel in accordance with the fourth embodiment of the present invention.

FIG. 8 is a graph showing a relationship between the LED drive current IF and the focal distance f in a motion compensation device and lens barrel in accordance with the fourth embodiment of the present invention. As shown in FIG. 8, the LED 51 drive current IF is represented on the ordinate, and the focal distance f is represented on the abscissa. The CPU 3b applies the output voltage $V_{IF}$ to the light amount adjustment unit 73 such that the drive current IF changes according to the focal distance f.

As shown in FIG. 7, the LED position detection unit 72 detects the position of the LED 51 which moves in a direction parallel to the optical axis I. The LED position detection unit 72 is, for example, a photointerruptor or the like. The LED position detection unit 72 feeds back to the CPU 3b LED position information relating to the detected position of the LED 51.

Figure 9:
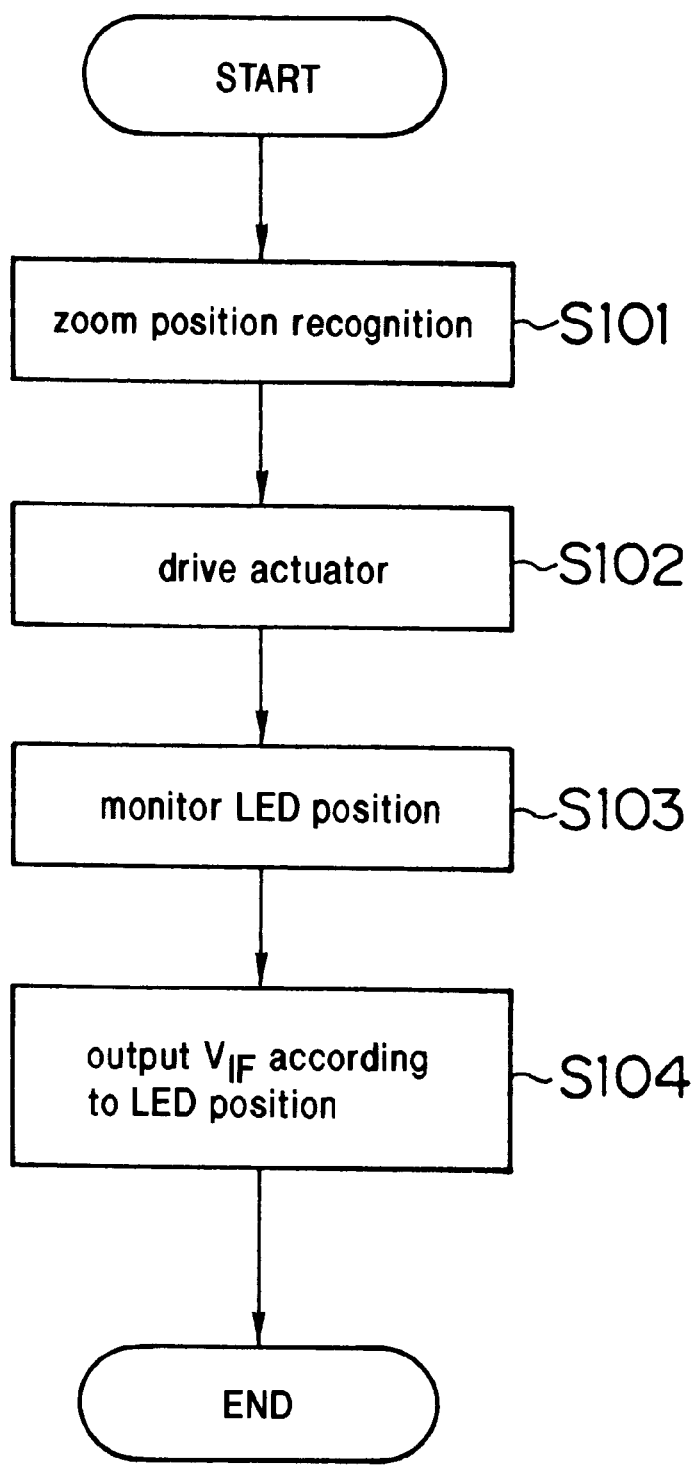
FIG. 9 is a flow chart of an operational process for operating a light amount adjustment unit and LED position detection unit of a motion compensation device and lens barrel in accordance with the fourth embodiment of the present invention.

The operation of the light amount adjustment unit 73 and the LED position detection unit 72 in accordance with the fourth embodiment of the present invention will now be described below with reference to FIG. 9. FIG. 9 is a flow chart illustrating an operational process for operation of the light amount adjustment unit 73 and the LED position detection unit 72 of a motion compensation device and lens barrel in accordance with the fourth embodiment of the present invention.

In step ("S" hereinbelow) 101, a zoom position is identified by the zoom position detection unit 40. More particularly, the zoom position detection unit 40 detects the position of the zoom optical system 84 in the optical axis I direction, and outputs zoom lens position information to the CPU 3b.

Continuing in S102, the linear type actuator 70 is driven. The CPU 3b controls driving of the linear type actuator 70 based on the zoom lens position information output by the zoom position detection unit 40. Because the LED 51 is integral with the linear type actuator 70, the LED 51 moves in a direction parallel to the optical axis I.

Next, in S103, the position of the LED 51 is monitored. The LED position detection unit 72 detects the position of the LED 51 in the optical axis I direction, and outputs LED position information to the CPU 3b.

Finally, in S104, the CPU 3b outputs an output voltage $V_{IF}$ according to the position of the LED 51. The CPU 3b applies the output voltage $V_{IF}$ to the light amount adjustment unit 73 from the built-in D/A converter 31, based on the LED position information output by the LED position detection unit 72. The light amount adjustment unit 73 adjusts the drive current IF to adjust the amount of light emitted by the LED 51.

The motion compensation device and lens barrel in accordance with the fourth embodiment of the present invention has the following advantageous effects, in addition to the effects of the second and third embodiments described hereinabove.

In accordance with the fourth embodiment of the present invention, the light amount adjustment unit 73 adjusts the drive current of the LED 51 according to the focal distance. Accordingly, even with changes in the distance between the LED 51 and PSD 54, by adjusting the amount of light emitted by the LED 51, the amount of light incident on the PSD 54 can be kept constant.

Fifth Preferred Embodiment

Figure 10:
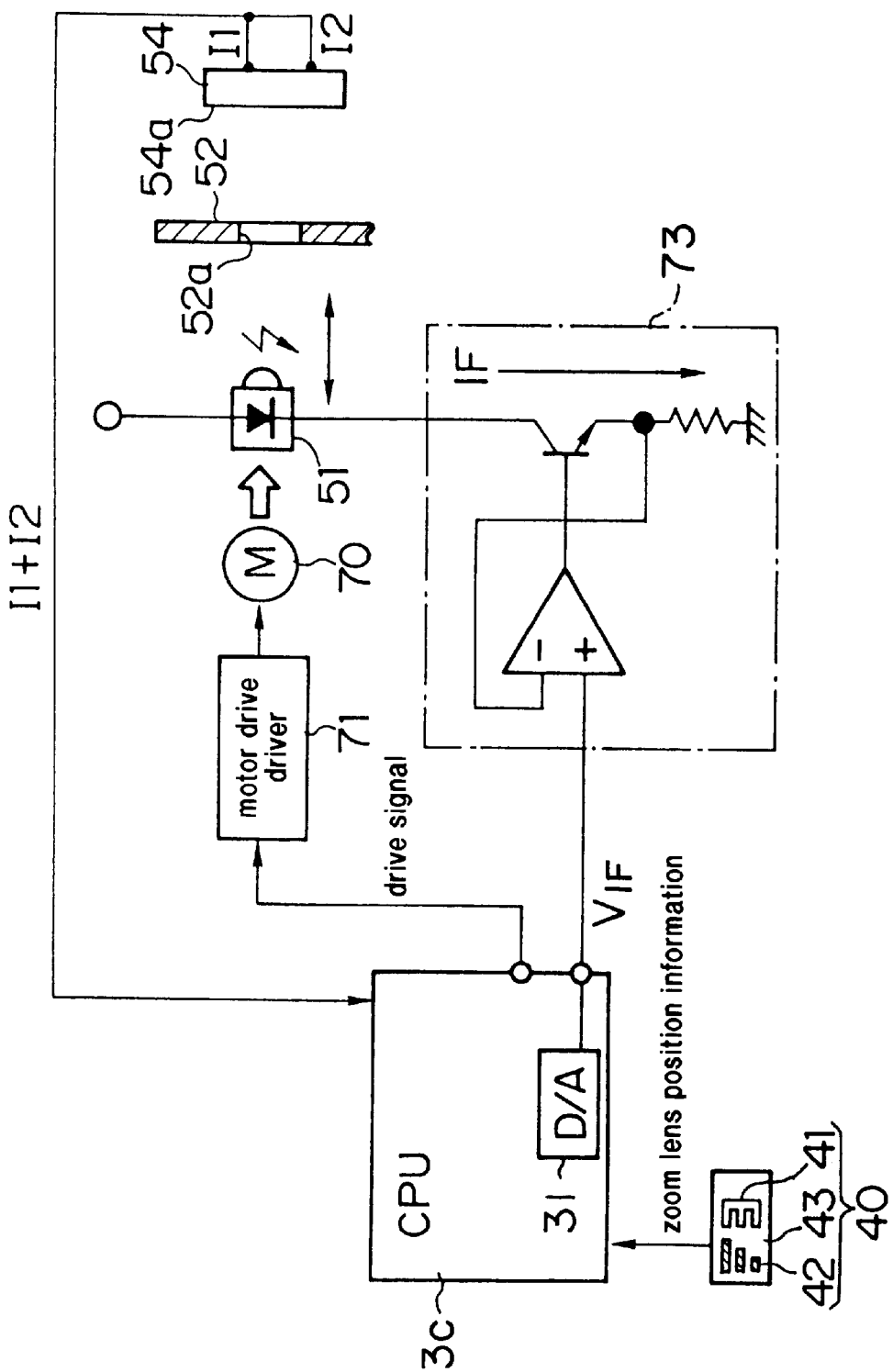
FIG. 10 is a block diagram of a light amount adjustment unit in a motion compensation device and lens barrel in accordance with a fifth embodiment of the present invention.

FIG. 10 is a block diagram of a light amount adjustment unit in a motion compensation device and lens barrel in accordance with a fifth preferred embodiment of the present invention. Elements which are the same as or similar to elements shown in FIG. 7 and described hereinabove are referred to by the same reference symbols, and a detailed description of these like elements will not be repeated here.

As shown in FIG. 10, the PSD 54, motor drive driver 71, and light amount adjustment unit 73 are connected to a CPU 3c. The CPU 3c is a one chip computer which variably controls the light amount adjustment unit 73 based on the position detection information output by the PSD 54. The CPU 3c adjusts the output voltage $V_{IF}$ of the built-in D/A converter 31 based on the output signals I1, I2 of the PSD 54.

More particularly, the PSD 54 outputs two signals I1, I2 which change according to a position of incidence of a light beam. The total I1+I2 of the two signals I1, I2 output by the PSD 54 is the total light quantity incident on the PSD 54. The CPU 3c detects the light amount of the LED 51 by monitoring the total of I1+I2, and adjusts the voltage $V_{IF}$ output to the light amount adjustment unit 73.

Figure 11:
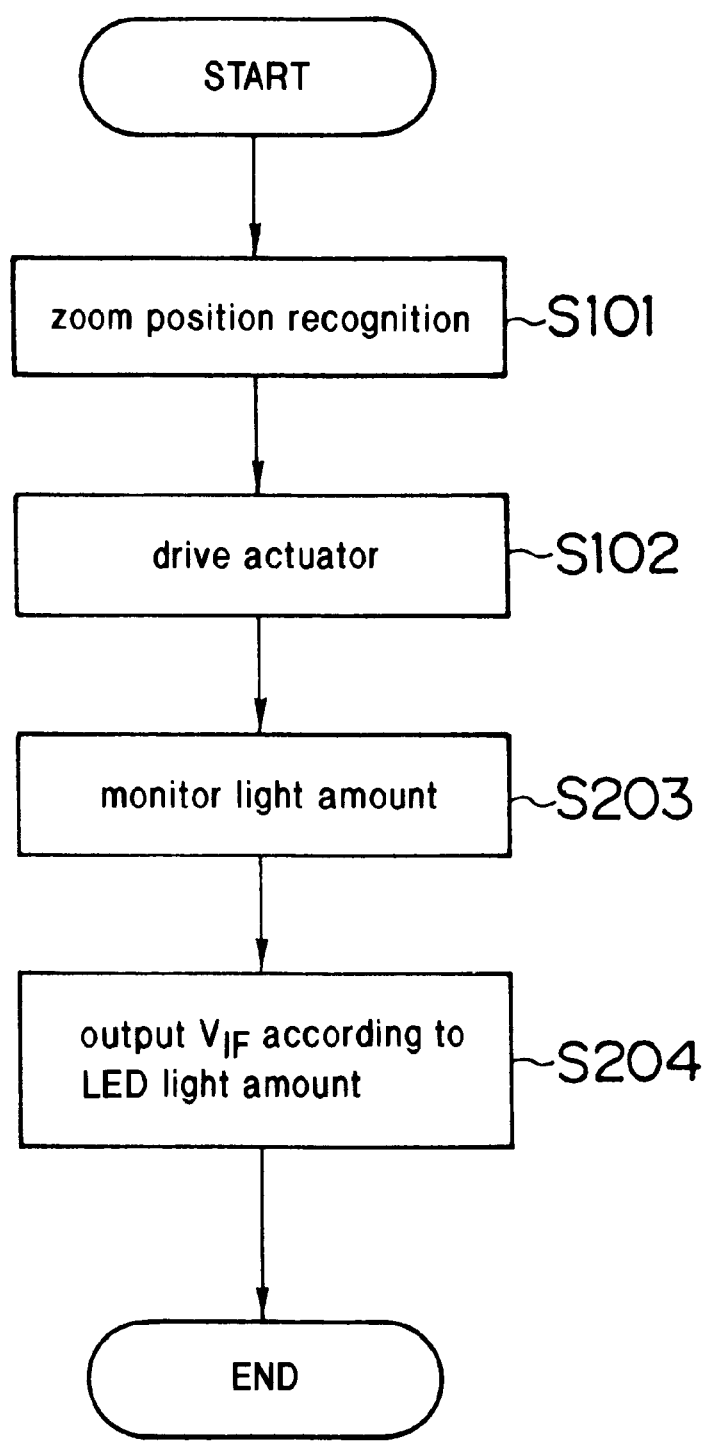
FIG. 11 is a flow chart of an operational process for operating the light amount adjustment unit of a motion compensation device and lens barrel in accordance with the fifth embodiment of the present invention.

The operation of the light amount adjustment unit 73 and the LED position detection unit 72 in accordance with the fifth embodiment of the present invention will now be described below with reference to FIG. 11. FIG. 11 is a flow chart illustrating an operational process for operating the light amount adjustment unit of a motion compensation device and lens barrel in accordance with the fifth embodiment of the present invention. Furthermore, steps illustrated in the flow chart of FIG. 11 which are the same as steps illustrated in FIG. 9 are referred to by the same reference symbols, and a detailed description of these like steps will not be repeated here.

After a zoom position is identified (S101) and the linear type actuator is driven (S102), in S203, the amount of light is monitored. Specifically, the CPU 3c monitors the total I1+I2 of the signals I1, I2 output by the PSD 54 to monitor the amount of light.

Next, in S204, the CPU 3c outputs a voltage $V_{IF}$ according to the position of the LED 51. The CPU 3c applies the output voltage $V_{IF}$ to the light amount adjustment unit 73 from the built-in D/A converter 31 based on the total I1+I2 of the signals I1, I2 output by the PSD 54. The light amount adjustment unit 73 adjusts the drive current IF to adjust the light amount of the LED 51.

The motion compensation device and lens barrel in accordance with the fifth embodiment of the present invention has the following advantageous effects, in addition to the effects described above for the second through fourth embodiments of the present invention.

In accordance with the fifth embodiment of the present invention, the light amount adjustment unit 73 adjusts the drive current IF of the LED 51 based on the total I1+I2 of the signals I1, I2 output by the PSD 54. Accordingly, in a manner similar to the fourth embodiment of the present invention, even though no special sensor, such as the LED position detection unit 72 is disposed, the adjustment of the light amount emitted the LED 51 keeps the amount of light incident on the PSD 54 constant.

The present invention is not limited to the embodiments described hereinabove, and various modifications are possible without departing from the principles and spirit of the invention. Changes or modifications which fall within the scope of the appended claims are all to be considered as within the scope of the present invention.

The motion compensation device and lens barrel in accordance with the first embodiment of the present invention may comprise a lens barrel which performs zooming from a position to which the movable tube 5 is extended from the collapsed state. In this case, the movable tube 5, as shown in FIG. 1A, extends as far as the position in which photography is possible (Wide end) from the most retracted position (collapsed position), and further extends from the Wide end to the Tele end by a zooming operation. As a result, as shown in FIG. 1A, from the state in which the relative distance between the PSD 54 and LED 51 is sufficiently long, such that the relative distance becomes still longer, because the movable tube 5 performs a zooming operation, at the time of variable power photography, motion compensation can be performed with high precision.

The motion compensation device and lens barrel in accordance with the first embodiment of the present invention may comprise a motion compensation lens 10 including at least a portion of the photographic optical system which moves in the optical axis I direction together with the movable tube 5 by a zooming operation, and may comprise a lens barrel which varies the distance between the LED 51 and PSD 54.

In accordance with the first embodiment of the present invention, a PSD 54 is mounted on the fixed tube 4, and the position of the LED 51 changes according to the collapse operation of the movable tube 5. However, the PSD 54 may be mounted on the movable tube 5, and the LED 51 may be mounted on the fixed tube 4. Moreover, the LED 51 and the PSD 54 may be mutually movable in the optical axis I direction by, for example, a cam mechanism or the like. Furthermore, the motion compensation lens 10 and the slit plate 52 may move in the optical axis I direction coupled to the collapsing operation of the movable tube 5.

In accordance with the first embodiment of the present invention, the greater the separation distance between the LED 51 and the PSD 54, the more the precision of position detection of the motion compensation lens 10 can increase, but may be to the degree than this precision is sufficient.

In accordance with the first embodiment of the present invention, a so-called compact camera is described in which the camera body 2 and the fixed tube 4 are integral. However, the present invention is not limited to a camera having a camera body 2 integral with a fixed tube 4, and the fixed tube 4 and movable tube 5 may be an interchangeable lens which is freely detachable from the camera body 2.

In accordance with the second through fifth embodiments of the present invention, the interchangeable lens 8 was described with respect to an example of the motion compensation device 12 as part of the interchangeable lens 8. However, the present invention can also be applied to a lens integral type of camera equipped with a zoom lens.

In accordance with the second through fifth embodiments of the present invention described hereinabove, the position and focal distance of the zoom optical system 84 have a proportional relationship. For example, the proportional relationship has been described hereinabove with respect to a lens barrel 8 wherein the position and focal distance of the zoom optical system correspond one to one. However, the proportional relationship is not limited to a one to one proportion.

For example, the focal distance changes continuously, but the zoom optical system 84 extending in the optical axis I direction, the present invention can also be applied to a lens barrel such that a slightly returned position becomes the TELE end.

In accordance with the second through fifth embodiments of the present invention, a lens barrel having an LED 51 which moves integrally with the straight tube 85 has been described. However, the present invention is not limited to an LED 51 which moves integrally with a straight tube. For example, the motion compensation lens 10 and/or the PSD 54 may move in the optical axis I direction together with the straight tube 85 by a zooming operation, even for a lens barrel in which the LED 51 is mounted to the fixed member 16. Moreover, the motion compensation lens 10 and/or the PSD 54 and the LED 51 may mutually move, varying the relative distance of these elements.

In accordance with the first through fifth embodiments of the present invention, an LED 51 is used as the light emitting element. However, the present invention is not limited to an LED 51 as a light emitting element, and an infrared light emitting diode (IRED) or a small electric bulb may be used.

Moreover, the slit 52a may be a transparent portion which passes light, and not formed as an aperture.

Furthermore, the PSD 54 may be a two-dimensional PSD.

In accordance with the first through fifth embodiments of the present invention described hereinabove, the lens barrel 8 moves the LED 51 with a linear type actuator 70. However, the present invention is not limited to moving the LED 51 with a linear type actuator. For example, the present invention is also applicable to a lens barrel in which the LED 51 is mounted to a fixed member 16, and the motion compensation lens 10 and/or the PSD 54 are driven with a linear type actuator 70. In this case, a sensor which detects the position of the PSD 54 is necessary.

In accordance with the second through fifth embodiments of the present invention, the focal distance is detected by the zoom position detection unit 40, as disclosed in JP-A-8-5884. However, the present invention is not limited to the zoom encoder disclosed in JP-A-8-5884, and other types of known zoom encoders can be used.

In accordance with the second through fifth embodiments of the present invention, the position detection devices 20a, 20b include the LED 51, PSD 54, and slit plate 52. However, the position detection devices 20a, 20b are not limited to this construction. For example, a brush switch may be fixed to the motion compensation lens frame 11, and a conductive brush pattern disposed on the fixed member 16 to determine the position of the motion compensation lens 10.

In a device using the kind of brush switch described above, the width of the conductive portions themselves, or the interval between adjacent conductive portions, sets the position detection precision. Because of this, by changing the width of the conductive portions themselves, or the interval between adjacent conductive portions according to a change of focal distance, the position detection precision may change according to the focal distance, and an effect may be obtained similar to the second through fifth embodiments of the present invention.

Moreover, the position detection devices 20a, 20b which detect the position of the motion compensation lens 10 may detect the position based on the rotation number of the motors 14a, 14b. For example, a position detection device may be used having a disk with slits at equal intervals formed on a circular arc fixed to the output shaft of a motor 14a, 14b, with the output shaft of the motor 14a, 14b as the center, and with the disk between a light source and a light receiving unit. In operation of a position detection device having a disk with slits disposed between a light source and a light receiving unit, the light emitted by the light source and passing through the slits of the disk is received by the light receiving unit which generates a received light signal. When the output shafts of the motors 14a, 14b revolve, in the state in which the light emitted by the light source passes through a slit, the state in which the disk screens the light, periodically repeating, the received light forms a pulse form of signal. The rotation number of the motors 14a, 14b is calculated by counting the pulse form of signal, and based on this rotation number, the position of the motion compensation lens 10 can be calculated.

The position detection precision of a position detection device having a slitted disk can be set by the width of the slits themselves, or by the interval between adjacent slits. Because of this, an effect similar to the second through fifth embodiments of the present invention can be obtained by changing the position detection precision according to the focal distance, either by changing the width of the slits themselves or by changing the interval between adjacent slits according to the change of focal distance.

In accordance with the third embodiment of the present invention, as shown in FIG. 6, the CPU 3a controls driving of the linear type actuator 70 such that, as the zoom optical system 84 moves from the WIDE position to the TELE position, the distance $D_{ad}$ becomes larger, and the distance $D_{ad}$ becomes greatest at the TELE position. However, the present invention is not limited to this type of drive control. For example, the CPU 3a may control drive of the linear type actuator 70 to change the value of the distance $D_{ad}$ in a non-linear manner with respect to the focal distance f.

In accordance with the fourth embodiment of the present invention, as shown in FIG. 8, the CPU 3c controls the light amount adjustment unit 73 such that the drive current IF of the LED 51 becomes larger as the zoom optical system 84 moves from the WIDE position to the TELE position. However, the present invention is not limited to this type of control of the light amount adjustment unit 73.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A lens barrel, comprising:
   a motion compensation optical system;
   a movable tube which extends at a time of photography and retracts at a time of non-photography;
   a motion compensation optical system position detection unit to detect a position of the motion compensation optical system, the motion compensation optical system position detection unit including,
   a light emitting unit to project light, and
   a light position detection unit to receive light from the light emitting unit, and to detect a light receiving position; and
   a distance varying unit to vary a distance between the light emitting unit and the light position detection unit by causing the movable tube to move,
   wherein the light emitting unit and the light position detection unit are supported at one end by the movable tube, and are supported at another end by a fixed unit.

2. A lens barrel as recited in claim 1, wherein the motion compensation optical system position detection unit further comprises
   a light screening member between the light emitting unit and the light position detection unit and having a light passage unit through which at least a portion of the light from the light emitting unit passes, wherein the distance varying unit lengthens the distance between the light emitting unit and the light position detection unit according to the extending operation of the movable tube, to make smaller an angle between a light ray incident on the light passage unit and a line perpendicular to the light passage unit.

3. A lens barrel as recited in claim 1, wherein the distance varying unit shortens the distance between the light emitting unit and the light position detection unit according to a retraction operation of the movable tube.

4. A lens barrel as recited in claim 3, wherein when the movable tube is maximally retracted the lens barrel is shortest.

5. A lens barrel as recited in claim 1, wherein the distance varying unit varies a distance between the light emitting unit and the light position detection unit according to a retraction operation of the movable tube.

6. A lens barrel as recited claim 1, wherein the movable tube extends to a position in which photography is possible from a maximally retracted position, and a zooming operation of the lens barrel is performed from the position in which photography is possible.

7. A motion compensation device, comprising:
   a motion compensation optical system, the motion compensation optical system comprising at least a portion of a photographic optical system; and
   a position detection unit to detect the position of the motion compensation optical system, the position detection unit including
      a light emitting unit to project light,
      a light position detection unit to receive light from the light emitting unit and to detect the position of the received light, and
      a distance varying unit to vary the distance between the light emitting unit and the light position detection unit.

8. A motion compensation device as recited in claim 7, wherein the position detection unit includes
   a light screening member between the light emitting unit and the light position detection unit, the light screening member having a light passage unit to pass at least a portion of the light from the light emitting unit,
   wherein the distance varying unit lengthens the distance between the light emitting unit and the light position detection unit to make smaller an angle between a light ray incident on the light passage unit and a perpendicular line through the light passage unit.

9. A motion compensation device as recited in claim 7, wherein the distance varying unit varies the distance between the light emitting unit and the light position detection unit according to a movement in an optical axis direction of an optical system which comprises at least a portion of the photographic optical system.

10. A motion compensation device to compensate for motion of an image forming optical system causing image blur, comprising:
    a motion compensation optical system;
    a motion compensation optical system drive unit to drive the motion compensation optical system; and
    a motion compensation optical system position detection unit to detect a position of the motion compensation optical system, wherein the motion compensation optical system position detection unit includes
       a light emitting unit to project light,
       a light position detection unit to receive light from the light emitting unit, and to detect a position of the received light,
       a light screening member between the light emitting unit and the light position detection unit having a light passage unit to pass at least a portion of the light from the light emitting unit, and
       a distance varying unit to vary the distance between the light emitting unit and the light position detection unit according to a focal distance of the optical system.

11. A motion compensation device as recited in claim 10, wherein the distance varying unit varies the distance between the light emitting unit and the light position detection unit according to a zooming operation.

12. A motion compensation device as recited in claim 10, wherein the distance varying unit shortens the distance between the light emitting unit and the light position detection unit when the focal distance is short, and lengthens the distance between the light emitting unit and the light position detection unit when the focal distance is long.

13. A motion compensation device as recited in claim 10, wherein the distance varying unit makes smaller an angle between a light ray incident on the light passage unit and a line perpendicular to the light passage unit by lengthening the distance between the light emitting unit and the light position detection unit.

14. A motion compensation device as recited in claim 10, wherein when the motion compensation amount is constant, the motion compensation optical system drive unit drives the motion compensation optical system a greater amount for a shorter focal distance.

15. A motion compensation device as recited in claim 10, wherein the distance varying unit includes
    a focal distance detection unit to detect a focal distance,
    a position detection system drive unit to drive one of the light emitting unit and the light position detection unit, and
    a drive control unit to control the position detection system drive unit according to the detection result of the focal distance detection unit.

16. A motion compensation device as recited in claim 15, wherein the focal distance detection unit is a zoom encoder.

17. A motion compensation device as recited in claim 10, wherein the motion compensation optical system position detection unit includes a light amount adjustment unit to vary the amount of light projected by the light emitting unit according to the focal distance.

18. A motion compensation device as recited in claim 17, wherein the light amount adjustment unit varies the amount of light projected by the light emitting unit to make the amount of projected light greater as the focal distance increases.

19. A motion compensation device as recited in claim 17, wherein
    the light amount adjustment unit includes a position detection system position relation detection unit to detect a position of one of the light emitting unit and the light position detection unit, and
    a light amount varying unit to vary the amount of light projected by the light emitting unit according to the detection result of the position detection system position relation detection unit.

20. A motion compensation device as recited in claim 17, wherein the light amount adjustment unit includes a light amount varying unit to vary the amount of light projected by the light emitting unit based on the output signal of the light position detection unit.

21. A motion compensation device as recited in claim 17, wherein the light amount adjustment unit includes a focal distance detection unit to detect a focal distance, and a light amount varying unit to vary the amount of light projected by the light emitting unit according to the a focal distance detected by focal distance detection unit.

22. A motion compensation device to compensate for motion of an image forming optical system causing image blur, comprising:

a motion compensation optical system;

a motion compensation optical system drive unit to drive the motion compensation optical system;

a motion compensation optical system position detection unit to detect a position of the motion compensation optical system, wherein the motion compensation optical system position detection unit varies the precision of position detection according to a focal distance of the optical system.

23. A motion compensation device as recited in claim 22, wherein the motion compensation optical system position detection unit reduces the precision of position detection when the focal distance is short, and increases precision of position detection when the focal distance is long.

24. A motion compensation device as recited in claim 22, wherein the motion compensation optical system position detection unit includes a light emitting unit to project light;

a light position detection unit to receive light from the light emitting unit and to detect a position of the received light; and a light screening member between the light emitting unit and the light position detection unit having a light passage unit to pass at least a portion of the light from the light emitting unit.

25. A lens barrel as recited in claim 1, further comprising:

a moving unit which moves in the optical axis direction and supports at least a portion of a photographic optical system; and a fixed unit which supports the moving unit in a freely movable state, wherein the lens barrel, the light emitting unit and the light position detection unit are supported on one side by the moving member, and are supported on another side by the fixed unit.

\* \* \* \* \*